United States Patent
Kim et al.

(10) Patent No.: US 10,032,143 B2
(45) Date of Patent: Jul. 24, 2018

(54) PAYMENT SUPPORT METHOD AND SYSTEM

(71) Applicant: Samsung Electronics Co., Ltd., Suwon-si, Gyeonggi-do (KR)

(72) Inventors: Kyungdong Kim, Namyangju-si (KR); Shinwoo Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 20 days.

(21) Appl. No.: 14/818,837

(22) Filed: Aug. 5, 2015

(65) Prior Publication Data

US 2015/0339640 A1 Nov. 26, 2015

Related U.S. Application Data

(63) Continuation of application No. 14/163,017, filed on Jan. 24, 2014.

(30) Foreign Application Priority Data

Jan. 25, 2013 (KR) .................. 10-2013-0008505

(51) Int. Cl.
  *G06Q 20/10* (2012.01)
  *G06Q 20/36* (2012.01)
  *G06Q 20/40* (2012.01)

(52) U.S. Cl.
  CPC ............ *G06Q 20/10* (2013.01); *G06Q 20/36* (2013.01); *G06Q 20/363* (2013.01); *G06Q 20/4014* (2013.01)

(58) Field of Classification Search
  CPC ..................................................... G06Q 20/36
  USPC ........................................................ 705/41
  See application file for complete search history.

(56) References Cited

U.S. PATENT DOCUMENTS

| | | | |
|---|---|---|---|
| 2002/0073027 A1* | 6/2002 | Hui ................. | G06Q 20/02 705/40 |
| 2007/0288320 A1 | 12/2007 | Cooper et al. | |
| 2012/0143752 A1* | 6/2012 | Wong ............... | G06Q 20/105 705/41 |
| 2012/0203605 A1 | 8/2012 | Morgan et al. | |
| 2012/0296741 A1* | 11/2012 | Dykes ............. | G06Q 20/322 705/14.53 |

FOREIGN PATENT DOCUMENTS

| | | |
|---|---|---|
| KR | 10-2012-0076337 A | 7/2012 |
| KR | 10-2012-0076654 A | 7/2012 |
| KR | 10-1202295 B1 | 11/2012 |

* cited by examiner

*Primary Examiner* — Jessica Lemieux
(74) *Attorney, Agent, or Firm* — Jefferson IP Law, LLP

(57) ABSTRACT

A method and a system for payment support are provided. The payment support method may include creating an account used for a payment service via a wallet server apparatus, connecting to the wallet server apparatus using the account, registering personal identification information including hardware information of a terminal device in the account, and associating at least one payment option with the personal identification information stored in the wallet server apparatus.

20 Claims, 25 Drawing Sheets

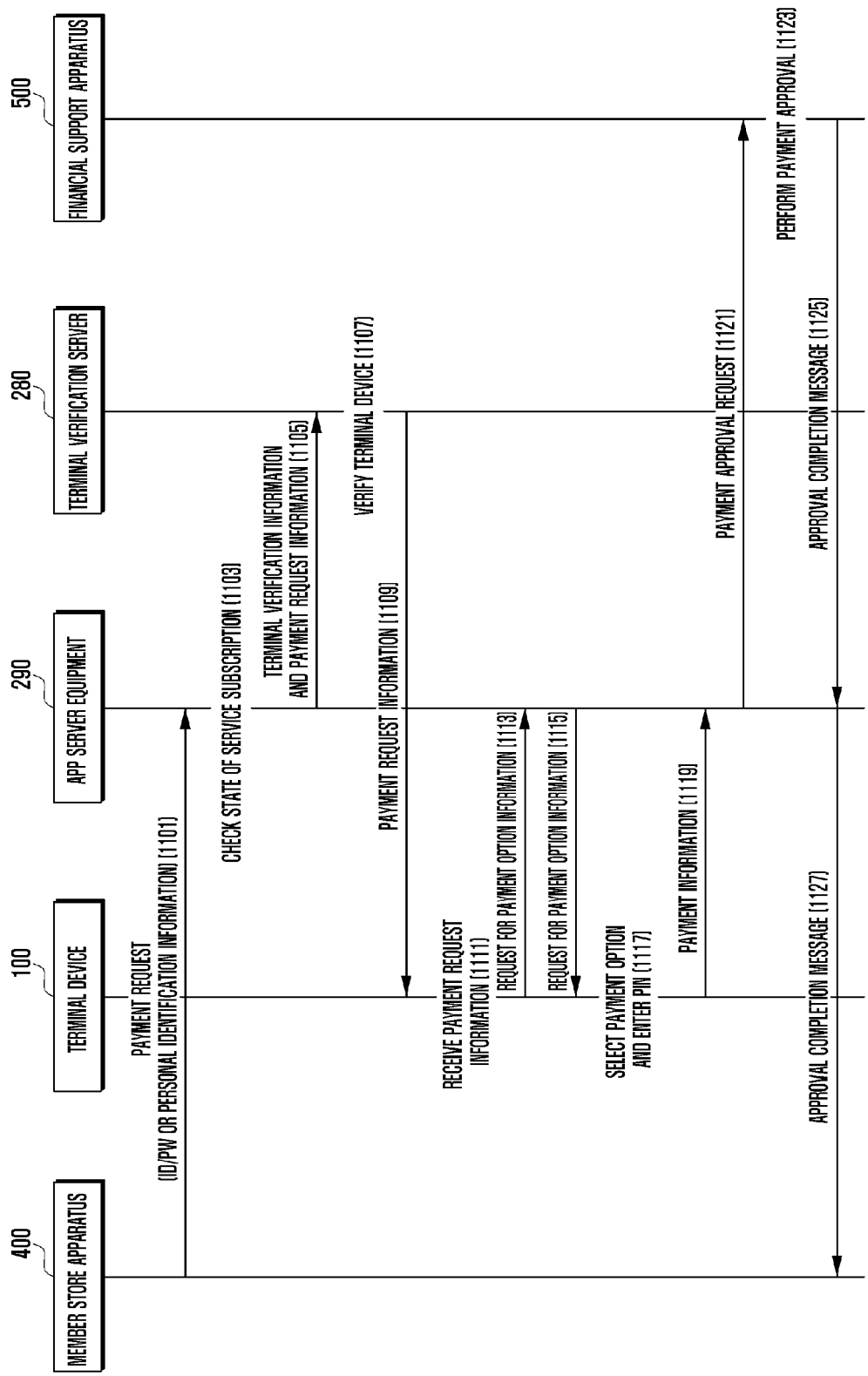

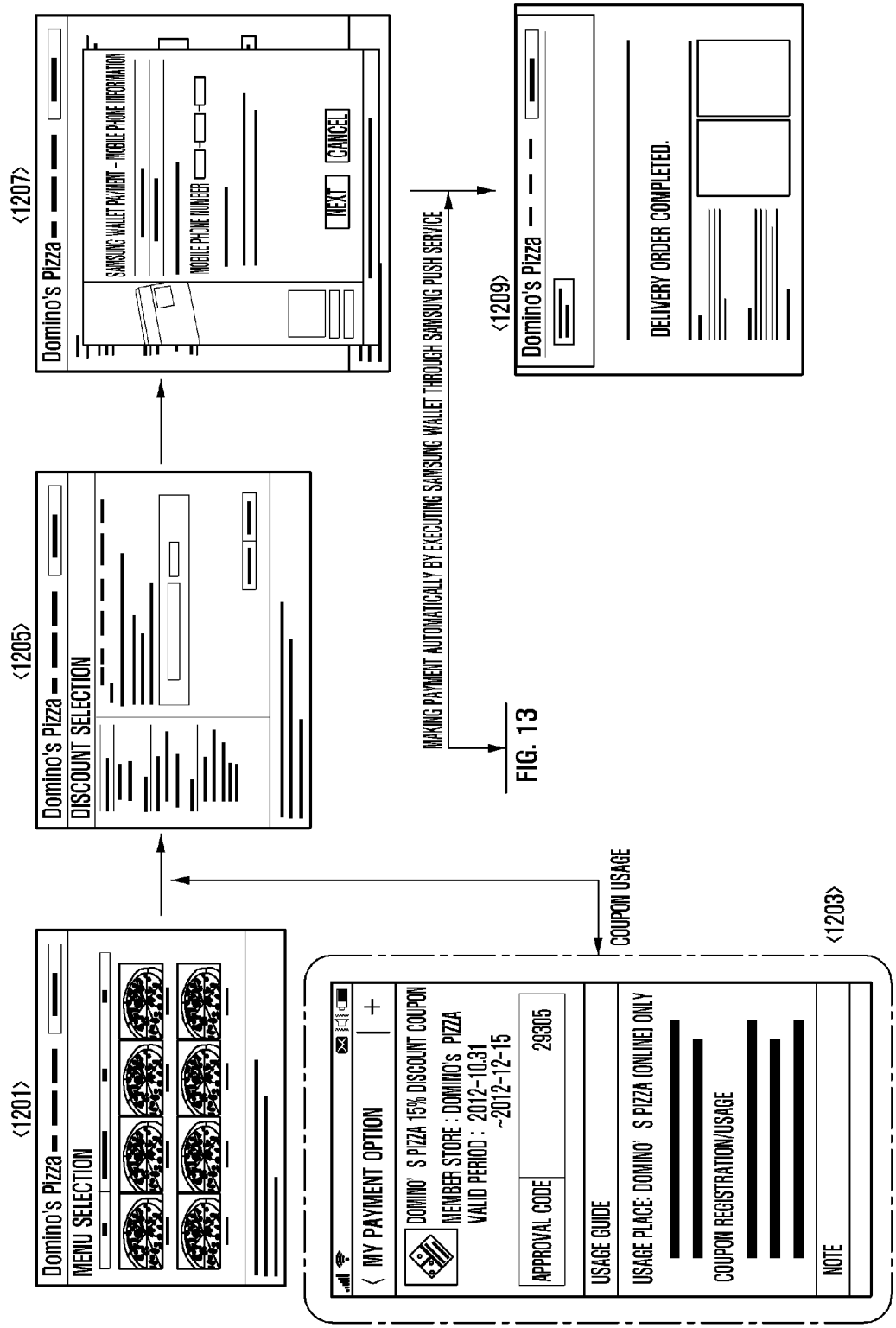

PAYMENT SUPPORT METHOD AND SYSTEM

CROSS-REFERENCE TO RELATED APPLICATION(S)

This application is a continuation application of a prior application Ser. No. 14/163,017, filed on Jan. 24, 2014, which claimed the benefit under 35 U.S.C § 119(a) of a Korean patent application filed on Jan. 25, 2013 in the Korean Intellectual Property Office and assigned Serial number 10-2013-0008505, the entire disclosure of each of which is hereby incorporated by reference.

TECHNICAL FIELD

The present disclosure relates to a payment method. More particularly, the present disclosure relates to a payment support method and system that enables a terminal device to perform payment in a more secure and convenient manner.

BACKGROUND

With widespread usage of credit cards, consumers may make payments for goods and services using credit cards instead of cash. Currently, due to advances in Internet technology, an increasing number of financial transactions are now performed in cyberspace rather than in person, and payment methods in cyberspace have been diversified accordingly.

For purchase and payment using a credit card in cyberspace, a user provides preregistered credit card information to a service equipment requesting payment for a product, and a related financial institution pays requested money to the service equipment. More specifically, when a user buys a product using a credit card, a financial institution ensuring credit of the credit card pays the seller for the product and the user makes a credit card payment to the financial institution. The user may directly enter the credit card information at the time of purchase or may use credit card information pre-stored in a terminal device. In most cases, the terminal device used to store credit card information is a mobile terminal carried by the user.

In the payment process, the financial institution simply confirms information directly input by a cardholder, in which case a serious security problem may arise. For example, a malicious user having already stolen financial information of an innocent user, in some way or another, may make a purchase and payment in cyberspace using the stolen financial information.

Accordingly there is a need for an improved method and system that permit only a properly authorized user to obtain approval for purchase and payment by verifying card information in a multifaceted way with respect to preregistered terminal hardware information, financial information and personal identification information so as to improve security.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a payment support method and system that permit only a properly authorized user to obtain approval for purchase and payment by verifying card information in a multifaceted way with respect to preregistered terminal hardware information, financial information and personal identification information so as to improve security.

Another aspect of the present disclosure is to provide a payment support method and system that permit a user to manage multiple terminals based on a single account so that the user may obtain approval for payment in a convenient manner using one of the multiple terminals.

Another aspect of the present disclosure is to provide a payment support method and system that enable organizational entities involved in a transaction to enhance security without modification of existing procedures.

In accordance with another aspect of the present disclosure, a payment support system is provided. The payment support system includes a wallet server apparatus configured to support generation of an account of a payment service, and a terminal device configured to connect to the wallet server apparatus using the account, wherein the terminal device registers personal identification information including hardware information of the terminal device in the account and associates at least one payment option with the personal identification information stored in the wallet server apparatus.

In accordance with an aspect of the present disclosure, a payment support method is provided. The payment support method includes creating an account used for a payment service via a wallet server apparatus, connecting to the wallet server apparatus using the account, registering personal identification information including hardware information of a terminal device in the account, and associating at least one payment option with the personal identification information stored in the wallet server apparatus.

The present disclosure applies an optimized payment approval scheme without significant modification of existing payment system components, promoting system expandability through an independent system configuration.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 5, 6A, and 6B illustrate screen representations for terminal registration according to an embodiment of the present disclosure;

FIG. 11 is a sequence diagram illustrating a payment making procedure according to an embodiment of the present disclosure;

FIGS. 12, 13, 14, and 15 illustrate screen representations that may be presented in a payment making procedure according to an embodiment of the present disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
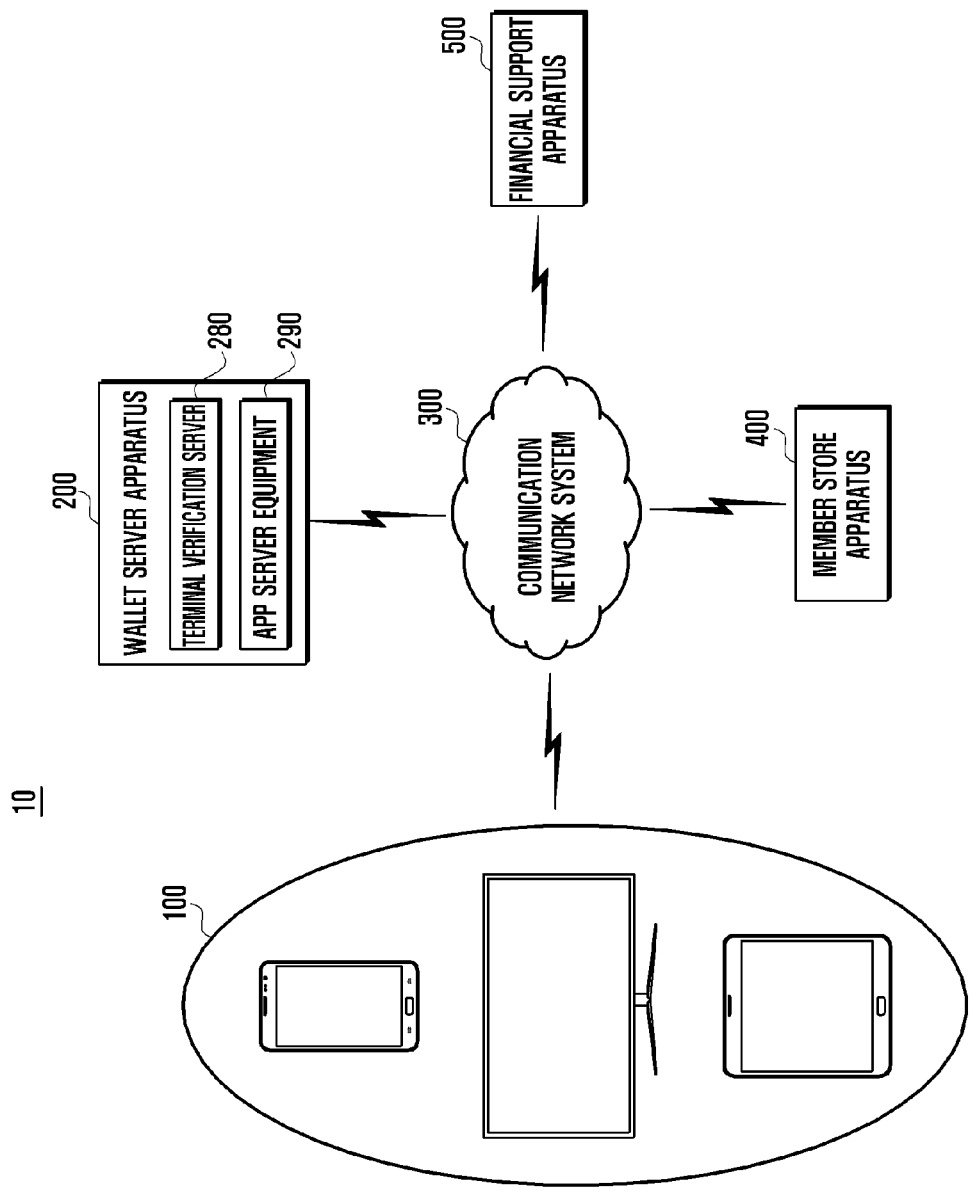
FIG. 1 illustrates an overall configuration of a payment support system according to an embodiment of the present disclosure.

FIG. 1 illustrates an overall configuration of a payment support system 10 supporting terminal based payment according to an embodiment of the present disclosure.

Referring to FIG. 1, the payment support system 10 may include one or more terminal devices 100 owned by a user, a wallet server apparatus 200, a member store apparatus 400, a financial support apparatus 500, and a communication network system 300.

In the payment support system 10 having the above configuration, the user of a terminal device 100 connects to the wallet server apparatus 200 through the communication network system 300 and registers an account used for payment approval in the wallet server apparatus 200. The account may contain text, images or biometric information suitable for personal identification. The user of the terminal device 100 may register at least one piece of payment approval information in the account. The payment approval information is information used by the user making payment for a purchase and may include personal identification information such as an individual ID and password, terminal information, and financial information. The terminal information may include various information contained in a terminal, such as information on the Universal Subscriber Identity Module (USIM) installed in the terminal device 100, information on the embedded Security Element (eSE) installed in the terminal device 100, unique hardware information such as a serial number of the terminal device 100, MAC address information of the terminal device 100, and unique identification information of a memory module installed in the terminal device 100. In the following description, the serial number of the terminal device 100 is mainly used as the terminal hardware information.

As the user may use multiple terminal devices, payment approval information for each terminal device may be registered in the same account. Not only a mobile communication terminal, but also other types of terminals capable of accessing the wallet server apparatus 200 and the financial support apparatus 500 through the communication network system 300 may serve as the terminal device 100. For example, a smart TV, desktop computer, laptop computer, and electronic note pad may act as a terminal device 100. In the following description, a mobile terminal equipped with a USIM supporting mobile communication is mainly used as the terminal device 100.

The terminal device 100 may connect to the wallet server apparatus 200 through the communication network system 300, receive a wallet program from the wallet server apparatus 200 and install the wallet program. The wallet program may support user verification when a financial payment request is made. The terminal device 100 may use the wallet program to connect to the wallet server apparatus 200, receive a wallet page from the wallet server apparatus 200, and display the received wallet page on a display unit. The user may manipulate the wallet page to create an account for payment and to register payment approval information including terminal hardware information, USIM information, eSE information, personal identification information and financial information in the account. The payment approval information may be registered together with multiple terminals according to user consent. Hence, the same payment approval information may be used by multiple terminals for payment. Components of the terminal device 100 and their operations are described in more detail later with reference to the drawings.

The wallet server apparatus 200 may perform user verification for the terminal device 100 and support information exchange between the member store apparatus 400 and the financial support apparatus 500. The wallet server apparatus 200 may provide a wallet program to a terminal device 100 connected to the communication network system 300 and making a request for payment operation of the present disclosure. The wallet server apparatus 200 may associate an account with the user of the terminal device 100 according to activation of the wallet program and support payment operation of the user for a purchase through the account. In particular, the wallet server apparatus 200 stores personal identification information such as individual ID and password information, terminal hardware information, and financial information in conjunction as payment approval information. When a payment request message is received from a terminal device 100, the wallet server apparatus 200 verifies whether information contained in the payment request message matches with all of the corresponding payment approval information. For example, although a match is found in the personal identification information, USIM information and financial information, if the terminal hardware information does not match, the wallet server apparatus 200 may not send an approval code indicating successful verification to the terminal device 100. The wallet server apparatus 200 may send such an approval code to a terminal device 100 corresponding to the preregistered terminal hardware information. As a result, an approval code is not sent to a terminal device 100 whose terminal hardware information does not match the preregistered terminal hardware information. The wallet server apparatus 200 may be configured to include a terminal verification server 280 and an app server equipment 290. The configuration and operation of the wallet server apparatus 200 are described in more detail later with reference to the drawings.

The member store apparatus 400 may receive and install a merchant wallet program from the wallet server apparatus 200. The merchant wallet program may be a wallet program designed for a vendor or store. For example, the merchant wallet program may include a routine for forwarding information received from a terminal device 100 to the wallet server apparatus 200, and a routine for receiving and outputting an approval code from the wallet server apparatus 200. The member store apparatus 400 may provide a service page built to sell products to terminal devices 100. When a purchase request for a particular product is received through the service page from a terminal device 100, the member store apparatus 400 may send an approval request for payment for the purchase to the wallet server apparatus 200. After the wallet server apparatus 200 successfully verifies the terminal device 100 and payment information is transferred to the financial support apparatus 500, the member store apparatus 400 may receive an approval code from at least one of the wallet server apparatus 200 and the financial support apparatus 500. To support usage of an identification card, the member store apparatus 400 may further include a reader (not shown) to recognize an identification card, and a communication module to receive electronic identification card information. Upon collection of identification card information, the member store apparatus 400 may provide the identification card information to the app server equipment 290 of the wallet server apparatus 200.

When a payment approval request is received from the wallet server apparatus 200, the financial support apparatus 500 tries to obtain confirmation for payment from the corresponding terminal device 100 and performs payment approval upon successfully obtaining confirmation. The financial support apparatus 500 may be composed of multiple entities to deal with distinct payment options such as credit cards, account transfer, payment gateway, membership cards and coupons. The payment option may be selected from a preregistered list of payment options or may be set by default.

The communication network system 300 supports exchange of signals and data between the components of the payment support system 10. For data exchange between the components, the communication network system 300 may be composed of various communication instruments and modules supporting one or more communication schemes. For example, for payment support, the communication network system 300 may include various communication instruments to establish a communication channel for sending a service page from the member store apparatus 400 to a terminal device 100, a communication channel for sending a payment request from a terminal device 100 to the wallet server apparatus 200, a communication channel for sending a payment request from the member store apparatus 400 to the wallet server apparatus 200, a communication channel for exchanging data between the wallet server apparatus 200 and the financial support apparatus 500, and a communication channel for exchanging data between the financial support apparatus 500 and a terminal device 100.

Figure 2:
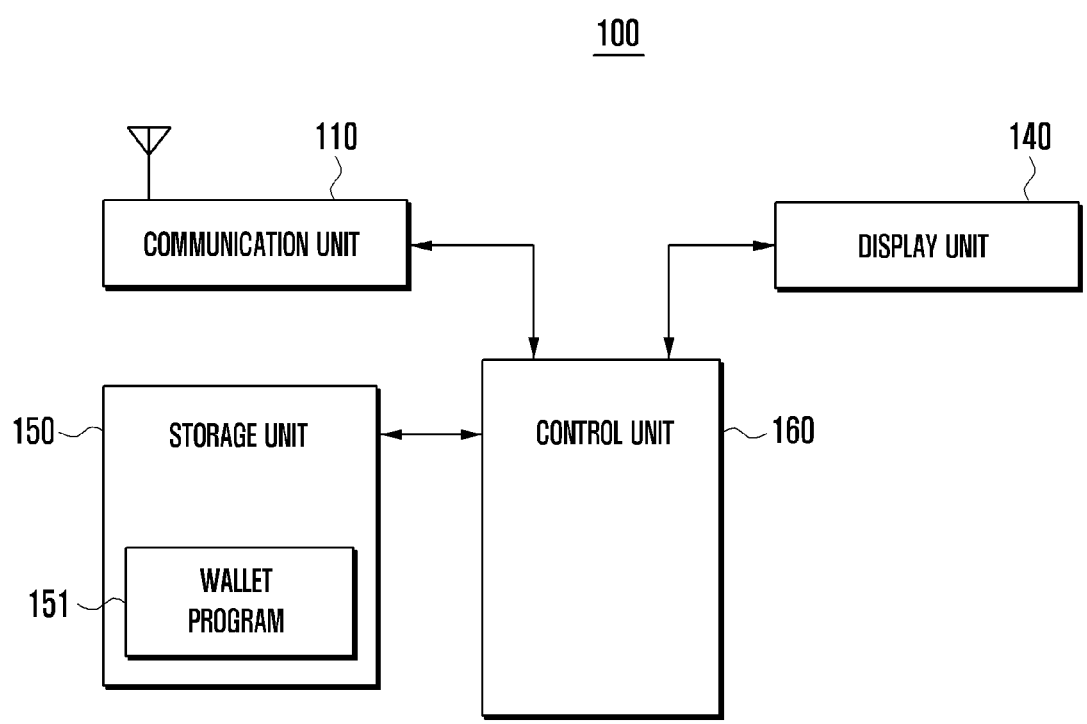
FIG. 2 is a block diagram of a terminal device shown in FIG. 1 according to an embodiment of the present disclosure.

FIG. 2 is a block diagram of a terminal device 100 supporting improved secure payment operation according to an embodiment of the present disclosure.

Referring to FIG. 2, the terminal device 100 may include a communication unit 110, a display unit 140, a storage unit 150 and a control unit 160. The display unit 140 supports touch functionality and may act as an input means. The terminal device 100 may further include hard keys for user input, and an audio processing unit to process audio information needed for payment support operation.

The terminal device 100 having the above configuration may receive a service page of purchasable products through the communication unit 110 from the member store apparatus 400 and output the received service page on the display unit 140. The terminal device 100 may use a preinstalled wallet program 151 to connect to the wallet server apparatus 200. The wallet program 151 may be received from the wallet server apparatus 200, be downloaded from a specific website or be received through USB serial communication, and may be stored and managed in the storage unit 150.

The terminal device 100 may collect a product from the service page and send a purchase request for the selected product to the member store apparatus 400. The terminal device 100 may connect to the wallet server apparatus 200 through the communication unit 110 and send login information to the wallet server apparatus 200. The terminal device 100 may receive various payment related pages from the wallet server apparatus 200 and output the received pages on the display unit 140. The user of the terminal device 100 may enter terminal hardware information, individual ID and password information matched with the preregistered payment approval information, and may also enter payment option information registered in the corresponding account. The terminal device 100 sends the information entered by the user to the wallet server apparatus 200.

In addition, the terminal device 100 may electronically store information on an identification card used for payment. The terminal device 100 may directly receive identification card information as user input from the user or receive the same from the wallet server apparatus 200. The identification card information may be one-off information according to the policy of the wallet server apparatus 200. One-off identification card information may be mapped with at least one of the account, the terminal and the identification card.

One-off identification card information may be provided as text, barcode, QR code or RFID information. One-off identification card information may be received through direct key input or a barcode reader, or through short-range communication in a form of RFID information.

To use a payment option using identification card information, the terminal device 100 may receive identification card information from the terminal verification server 280 in advance.

As described before, the terminal device 100 may register its hardware information together with an account in the wallet server apparatus 200. Hence, when the USIM of the terminal device 100 is transferred to a different terminal, the different terminal may be prohibited from using the payment service of the present disclosure. Hence, the user may register multiple terminal devices, which may be used to receive the payment service, on the account managed by the wallet server apparatus 200. For example, the user may register hardware information of a mobile terminal, hardware information of a desktop computer, and hardware information of a smart TV on the same account. In this case, the user may receive the payment service using the mobile terminal, the desktop computer or the smart TV. For example, the user may use the desktop computer or the smart TV to connect to the wallet server apparatus 200, which regards the connection as valid.

The terminal device 100 may register a piece of PIN information for each payment option as part of registration of the payment approval information. The PIN information serving as a payment password may be biometric information related to a fingerprint, voice sound, iris scan or other biometric feature. The PIN information may be stored in at least one of the wallet server apparatus 200 and the terminal device 100.

The terminal device 100 may also register a piece of PIN information for multiple payment options. In this case, the payment support system 10 permits the user to enter the same PIN information even if the user selects any one of the multiple payment options. In addition, the terminal device 100 may register a piece of PIN information for one account.

A payment procedure using the terminal device 100 is described in more detail later with reference to the drawings.

Figure 3:
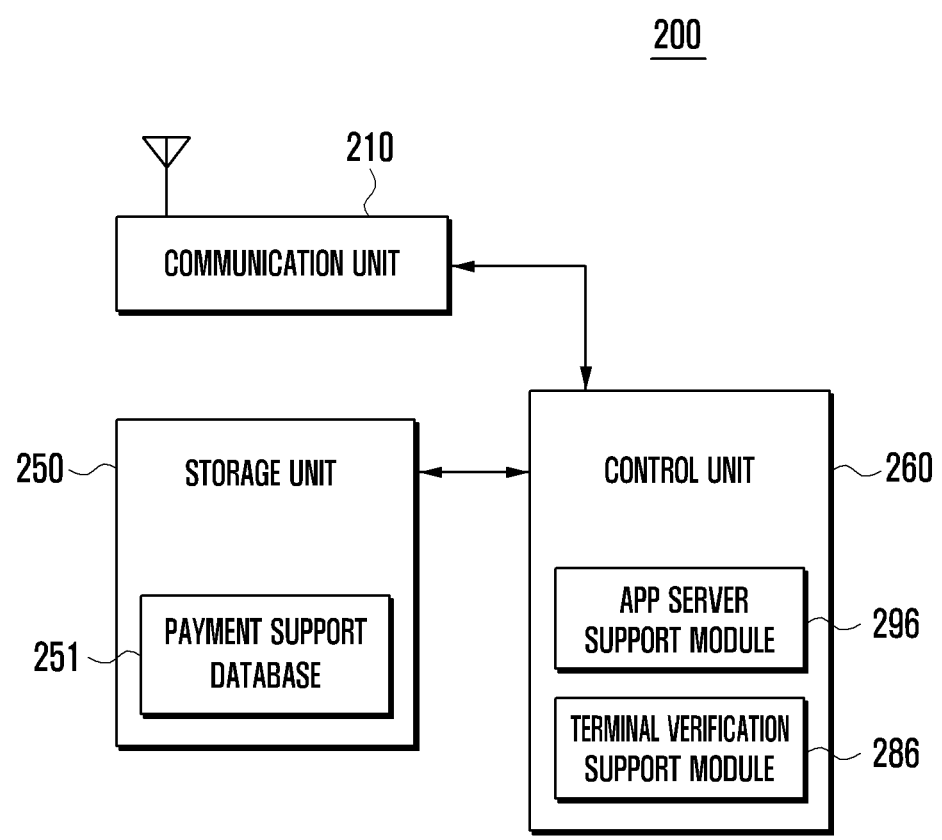
FIG. 3 is a block diagram of a wallet server apparatus shown in FIG. 1 according to an embodiment of the present disclosure.

FIG. 3 is a block diagram of a wallet server apparatus 200 according to an embodiment of the present disclosure.

Referring to FIG. 3, the wallet server apparatus 200 may include a communication unit 210, a storage unit 250, and a control unit 260. The wallet server apparatus 200 having the above configuration may establish communication channels to the terminal device 100, the member store apparatus 400 and the financial support apparatus 500 to exchange payment information through the communication unit 210. In the wallet server apparatus 200, the storage unit 250 may store a payment support database 251, which may maintain registered account information of terminal devices 100, terminal information registered in the accounts, and financial information mapped to the terminal information. The terminal information stored in the payment support database 251 may include not only a telephone number but also hardware information of a terminal device 100. The payment support database 251 may store an individual ID generated by mapping the terminal information. The payment support database 251 may also store a financial ID generated by the financial support apparatus 500 in connection with payment approval information of a registered terminal device 100. The financial ID may be generated for each payment option.

The control unit 260 of the wallet server apparatus 200 may include an app server support module 296 to operate the app server equipment 290, and a terminal verification support module 286 to operate the terminal verification server 280. The control unit 260 may operate the app server equipment 290 and the terminal verification server 280 as separate entities. Operations of the app server equipment 290 and the terminal verification server 280 are described in more detail later with reference to the drawings.

As described above, the wallet server apparatus 200 stores hardware information of a terminal device 100 as part of registration of payment approval information of the terminal device 100, improving security of payment operation.

Figure 4:
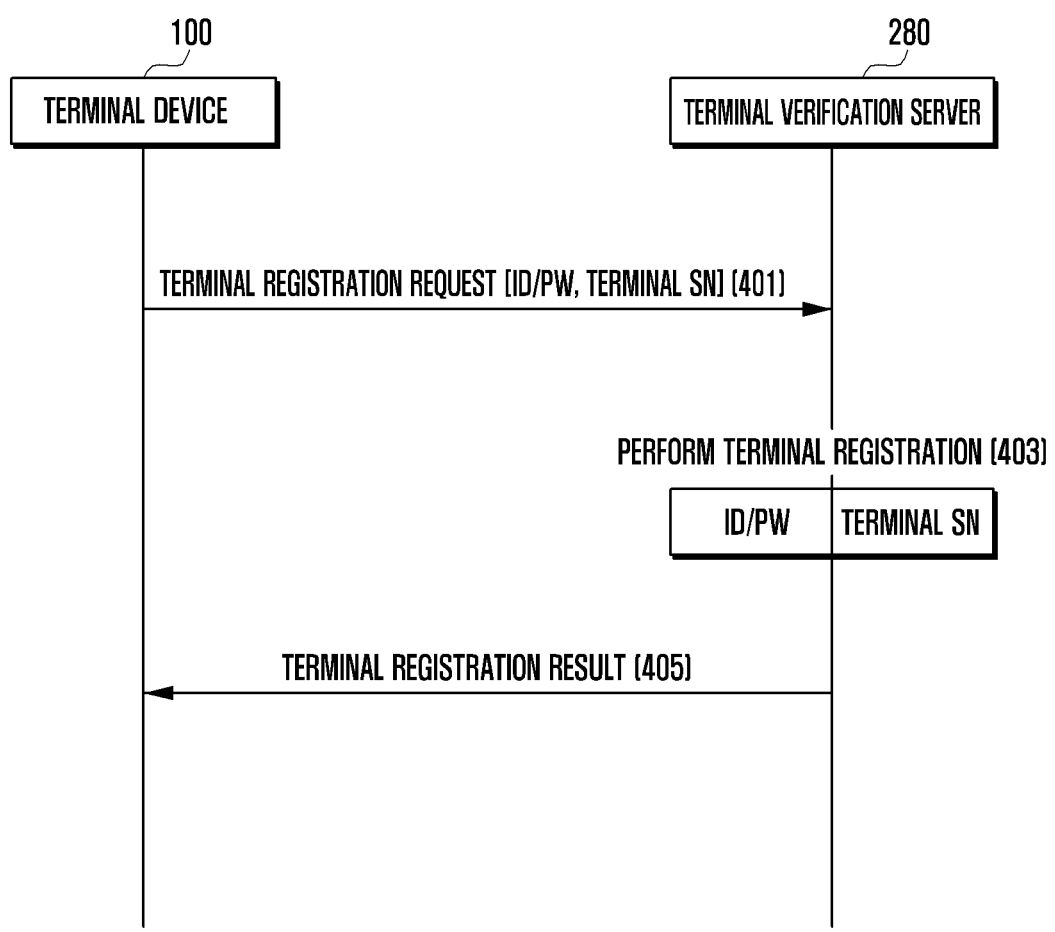
FIG. 4 is a sequence diagram illustrating a terminal registration procedure according to an embodiment of the present disclosure.

FIG. 4 is a sequence diagram illustrating a terminal registration procedure in a payment support method according to an embodiment of the present disclosure.

Referring to FIG. 4, at operation 401, a terminal device 100 sends a registration request to the terminal verification server 280 of the wallet server apparatus 200. To this end, the terminal device 100 installs a wallet program received from the terminal verification server 280. The terminal device 100 may activate the wallet program to connect to the terminal verification server 280. After activation of the wallet program, the terminal verification server 280 may receive an individual ID, password information and a terminal serial number from the terminal device 100. The terminal verification server 280 may provide a window having input fields for an individual ID, a password and a serial number to the terminal device 100. The terminal serial number may be directly entered by the user using an input unit or may be automatically found from hardware configuration information.

At operation 403, the terminal verification server 280 performs registration of the individual ID, password and serial number received from the terminal device 100. The terminal verification server 280 may register the serial number at an account created for the terminal device 100. The account may be associated with the individual ID and password. A user may create an account by connecting to the terminal verification server 280, entering personal information such as a social security number and address, and entering additional information requested by the terminal verification server 280. The created account may be used to access the terminal verification server 280 by entering individual ID and password information. When an account is already registered for the user of the terminal device 100 and a serial number of the terminal device 100 is received, the terminal verification server 280 registers the terminal device 100. At operation 405, the terminal verification server 280 sends a registration result to the terminal device 100.

Upon reception of a registration result from the terminal verification server 280, the terminal device 100 may output the registration result on the display unit 140. When an account for the user is not present in the terminal verification server 280, the user may create an account first.

Figure 5:
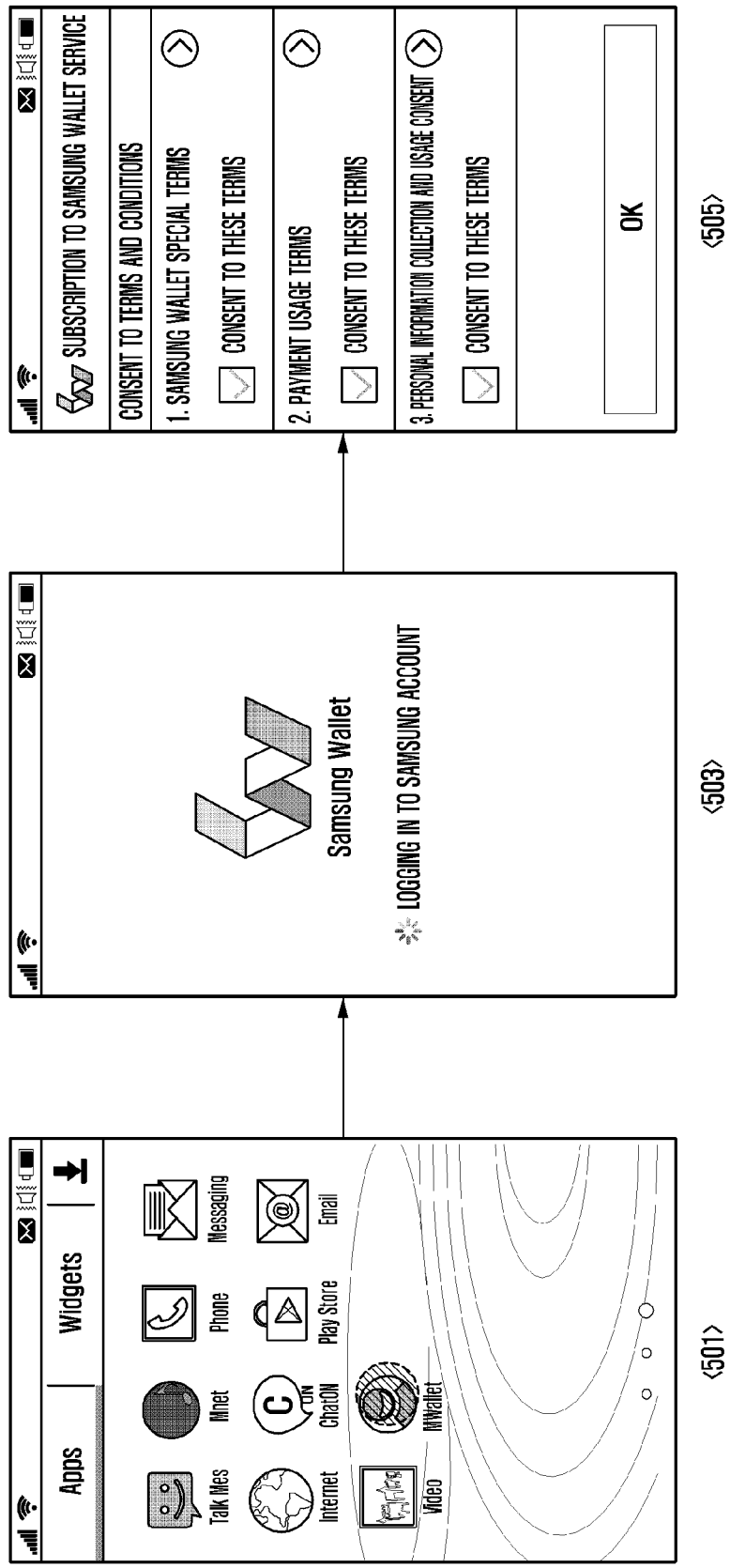
Figure 6A:
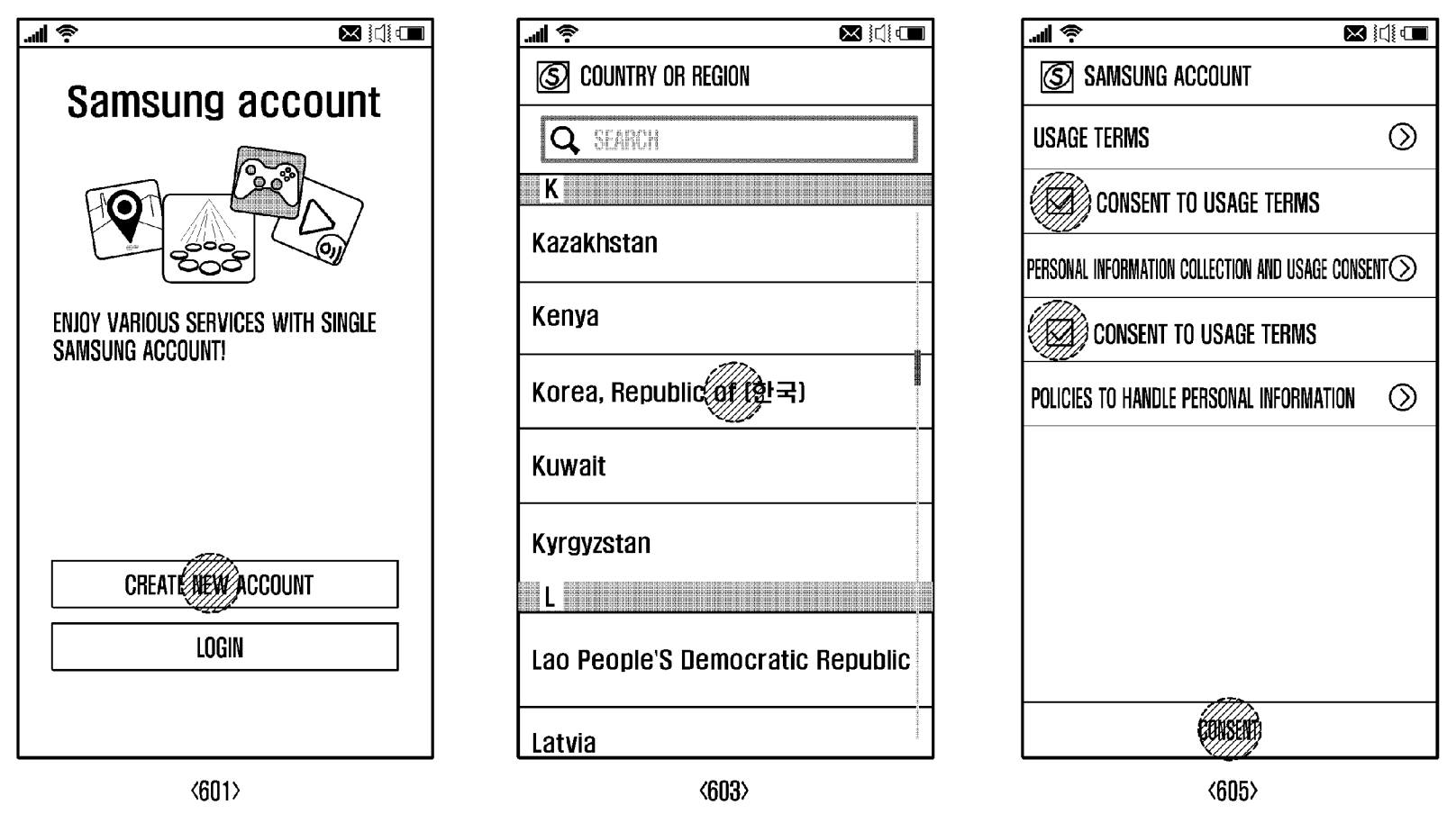
Figure 6B:
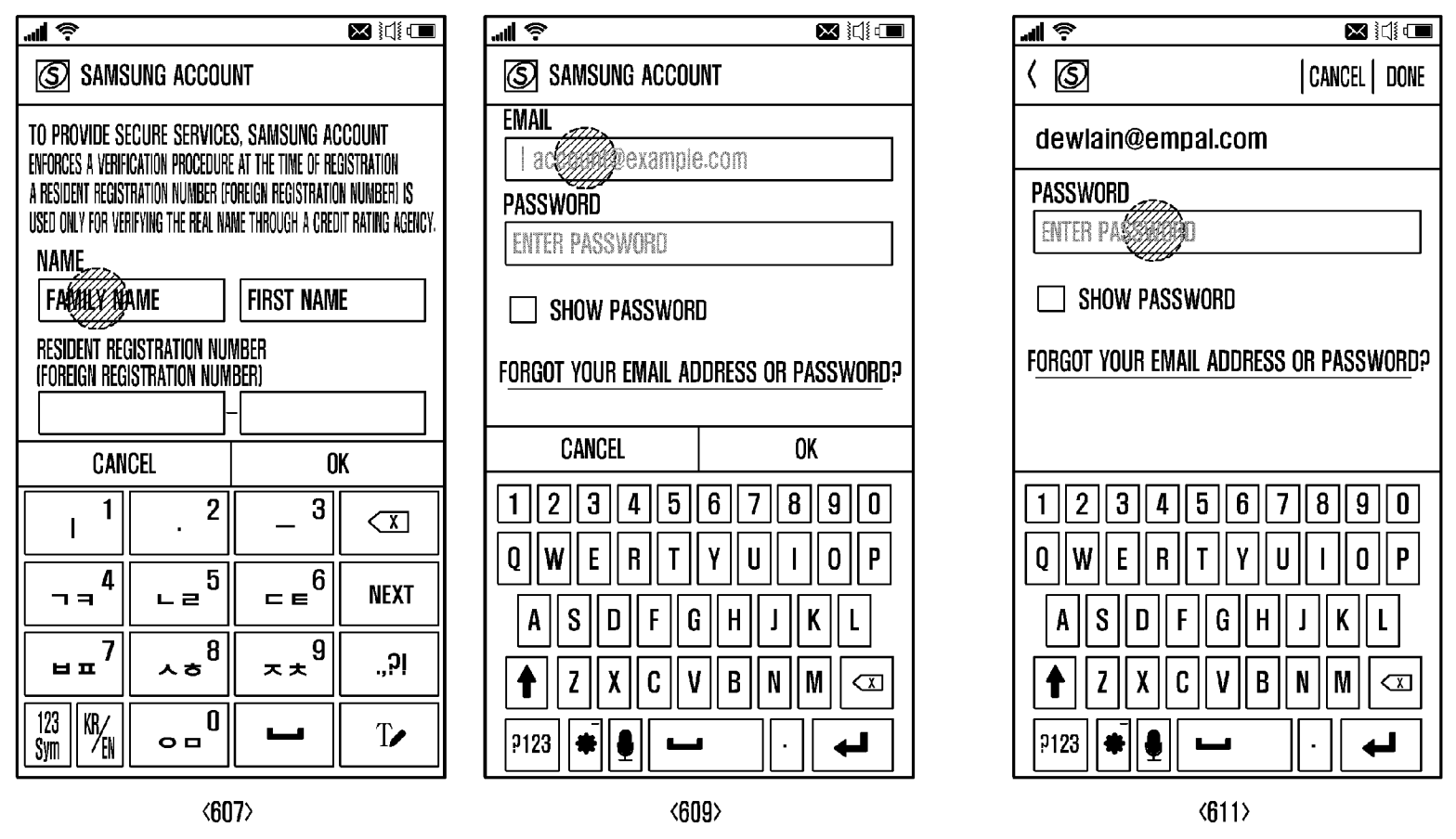

FIGS. 5 to 6B illustrate screen representations for terminal registration in a payment support method according to an embodiment of the present disclosure.

Referring to FIG. 5, the terminal device 100 may output various icons associated with menu items and widgets on the display unit 140 in a standby state. In particular, as in a screen 501, the terminal device 100 may output a wallet icon linked with a wallet program. Upon generation of an input event selecting the wallet icon, the terminal device 100 may output a screen for entering account information on the display unit 140. Upon reception of individual ID and password information, the terminal device 100 may output a screen 503 for logging in to a specific account on the display unit 140. The account information for login may be entered through manual character input, individual ID card, barcode recognition or the like. Previously entered account information may be reused for login if possible. Login to the account may further require verification of a password, fingerprint or the like.

After successful account login, the terminal device 100 may output a screen 505 for wallet service subscription. Upon generation of an input signal for wallet service subscription, the terminal device 100 may proceed to the next stage, for example, registration of payment approval information.

Meanwhile, when a registered account is not present after activation of the wallet program, the terminal device 100 may proceed to a phase depicted in FIGS. 6A and 6B.

Referring to FIGS. 6A and 6B, when no account is found in relation to the terminal device 100 after selection of the wallet icon in a state as in a screen 501, the terminal device 100 outputs an account creation screen as in a screen 601. When a preregistered individual ID and password are entered in the state as in screen 501, the terminal device 100 performs screen transition via a screen 503 to a screen 505.

When an item "new account creation" is selected in the screen 601, the terminal device 100 may output a screen 603 for country selection, a screen 605 for consenting to general, a screen 607 for real name verification, and a screen 609 for ID and password input in sequence. The output sequence of the screens for new account creation may differ according to design. The above screens may be a screen that is received from the wallet server apparatus 200 or the terminal verification server 280. The user may create a new account by selecting the country, consenting to general conditions, entering a real name, and entering an ID and password.

Upon completion of account creation, the terminal device 100 may output a screen 611 for account login received from the wallet server apparatus 200 on the display unit 140. When the user enters account login information, the terminal device 100 may proceed to the state indicated by screen 503. In this example, the account is identified by email information. However, the present disclosure is not limited thereto. For example, accounts may be identified by any distinct pieces of information such as combinations of characters, numerals, and special characters.

Figure 7:
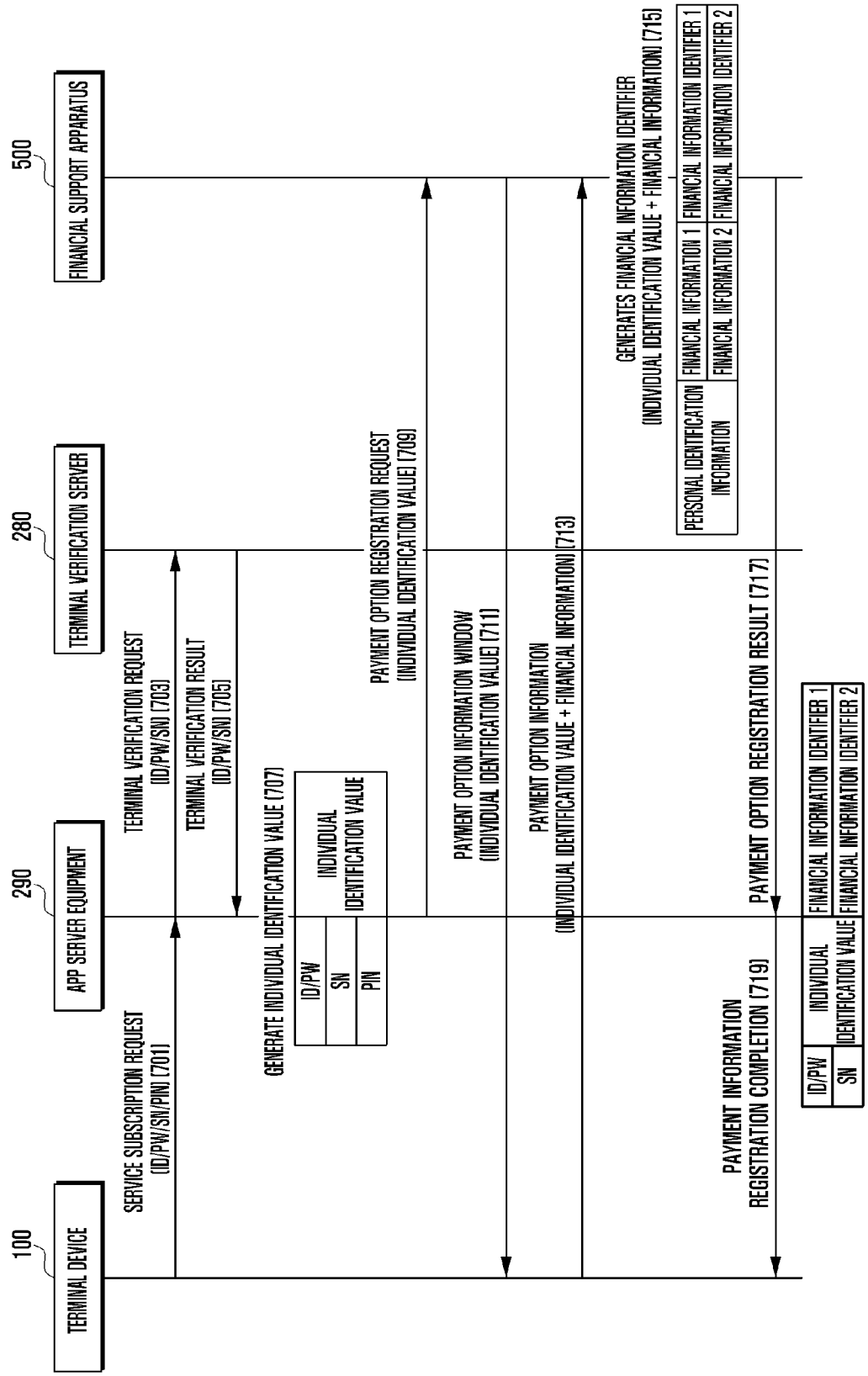
FIG. 7 is a sequence diagram illustrating a procedure for payment information registration according to an embodiment of the present disclosure.

FIG. 7 is a sequence diagram illustrating a procedure for payment information registration according to an embodiment of the present disclosure.

Referring to FIG. 7, to register payment information, at operation 701, the terminal device 100 sends a service subscription request to the app server equipment 290. Optionally, the terminal device 100 may create an account in the app server equipment 290 in advance. The service subscription request may contain subscription information such as individual ID, password, terminal serial number, and PIN information. Optionally, the terminal device 100 may output an input window for entering ID, password, terminal serial number and PIN information received from the app server equipment 290. The user may enter necessary information in the input window using an input unit of the terminal device 100.

Upon reception of a service subscription request containing subscription information from the terminal device 100, at operation 703, the app server equipment 290 sends a terminal verification request to the terminal verification server 280. The terminal verification request may contain the individual ID, password, and terminal serial number extracted from the subscription information received from the terminal device 100. The terminal verification server 280 verifies whether the user is a registered user by examining the received individual ID, password, and terminal serial number. At operation 705, the terminal verification server 280 sends a terminal verification result to the app server equipment 290.

If the terminal verification result received from the terminal verification server 280 indicates a registered user, at operation 707, the app server equipment 290 generates an individual identification value using the individual ID, password, terminal serial number and PIN information. If the terminal verification result received from the terminal verification server 280 indicates an unregistered user, the app server equipment 290 may send a registration recommendation message (not shown) notifying an unregistered user to the terminal device 100.

Upon generation of an individual identification value, at operation 709, the app server equipment 290 sends a payment option registration request containing the individual identification value to the financial support apparatus 500. At operation 711, the financial support apparatus 500 sends a payment option information window containing the individual identification value to the terminal device 100.

Upon reception of a payment option information window, at operation 713, the terminal device 100 provides payment option information to the financial support apparatus 500 by entering card information in the payment option information window. The card information may include a card identifier, valid duration or other information defined by the financial support apparatus 500. The payment option information sent by the terminal device 100 to the financial support apparatus 500 may contain the received individual identification value to thereby indicate payment option registration.

Upon reception of payment option information, at operation 715, the financial support apparatus 500 generates a financial information identifier based on financial information. Multiple financial information identifiers may be generated. For example, for a given individual identification value, the financial support apparatus 500 may associate one financial information identifier with one piece of financial information. When multiple pieces of card information are registered, multiple financial information identifiers are associated respectively with multiple pieces of financial information. After generation of the financial information identifier, at operation 717, the financial support apparatus 500 sends a payment option registration result to the app server equipment 290. The app server equipment 290 may store the individual ID, password, terminal serial number, individual identification value, and at least one financial information identifier. Upon reception of a payment option registration result from the financial support apparatus 500, at operation 719, the app server equipment 290 notifies the terminal device 100 of payment information registration completion.

FIGS. 8A to 10B illustrate screen representations for payment information registration according to an embodiment of the present disclosure.

Figure 8A:
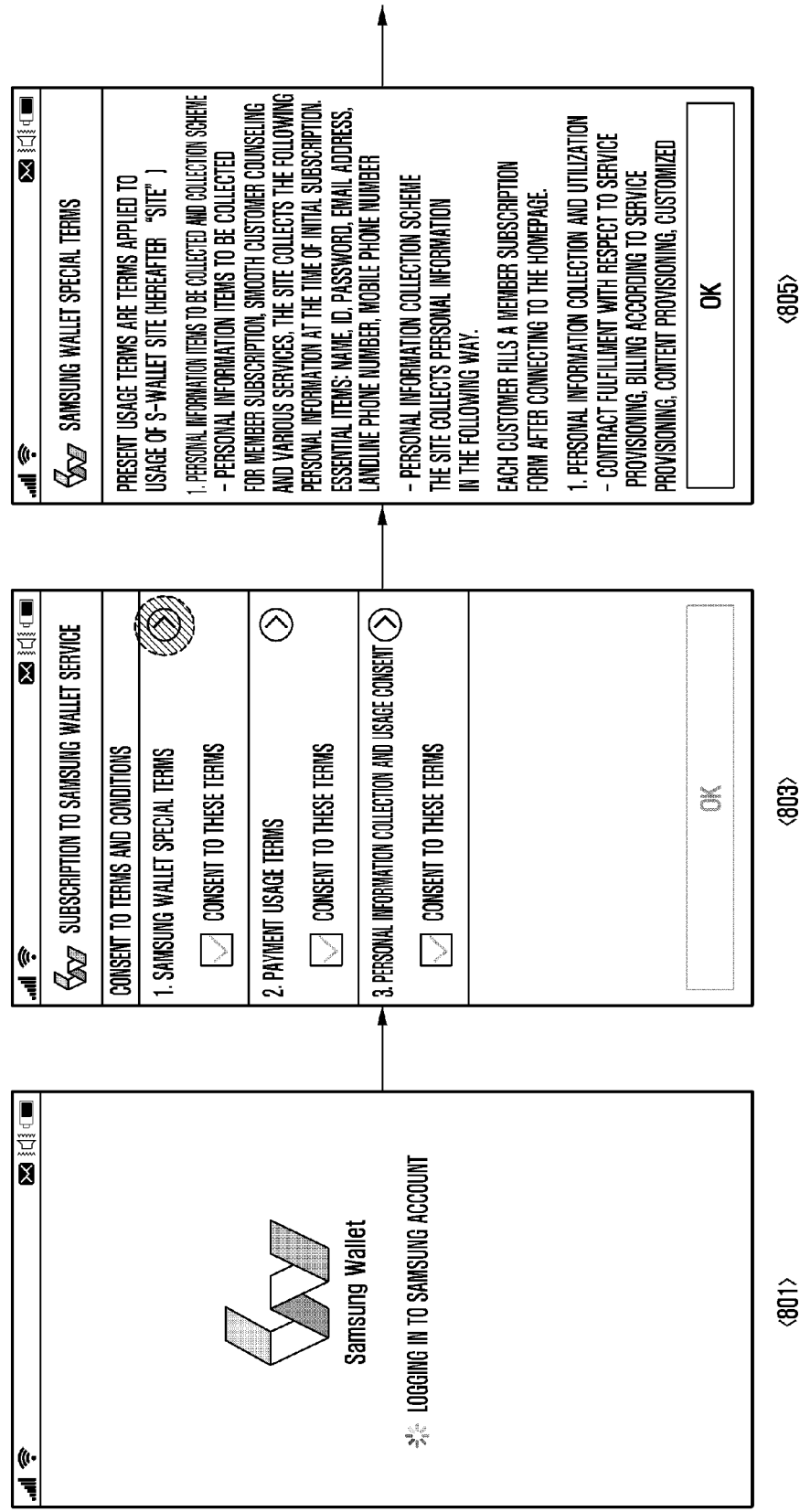
FIGS. 8A, 8B, 9, 10A, and 10B illustrate screen representations for payment information registration according to an embodiment of the present disclosure.

Referring to FIG. 8A, in response to an input event for selecting the wallet icon or a wallet service, the terminal device 100 activates the wallet program and connects to the wallet server apparatus 200 through the wallet program. The wallet server apparatus 200 may provide an account login screen to the terminal device 100. When the user enters an account ID and password, the terminal device 100 forwards the ID and password to the wallet server apparatus 200 to log in to the associated account, and may output a login progress screen 801 received from the wallet server apparatus 200. When account login is successful (i.e. the input account ID and password match the preregistered account ID and password), the terminal device 100 may receive a terms-and-conditions screen 803 from the wallet server apparatus 200 and output the same on the display unit 140 to obtain user consent. When an item "wallet special terms" is selected in the screen 803, the terminal device 100 may receive detailed information of the selected item from the wallet server apparatus 200 and output the detailed information in a screen 805 on the display unit 140 as.

Figure 8B:
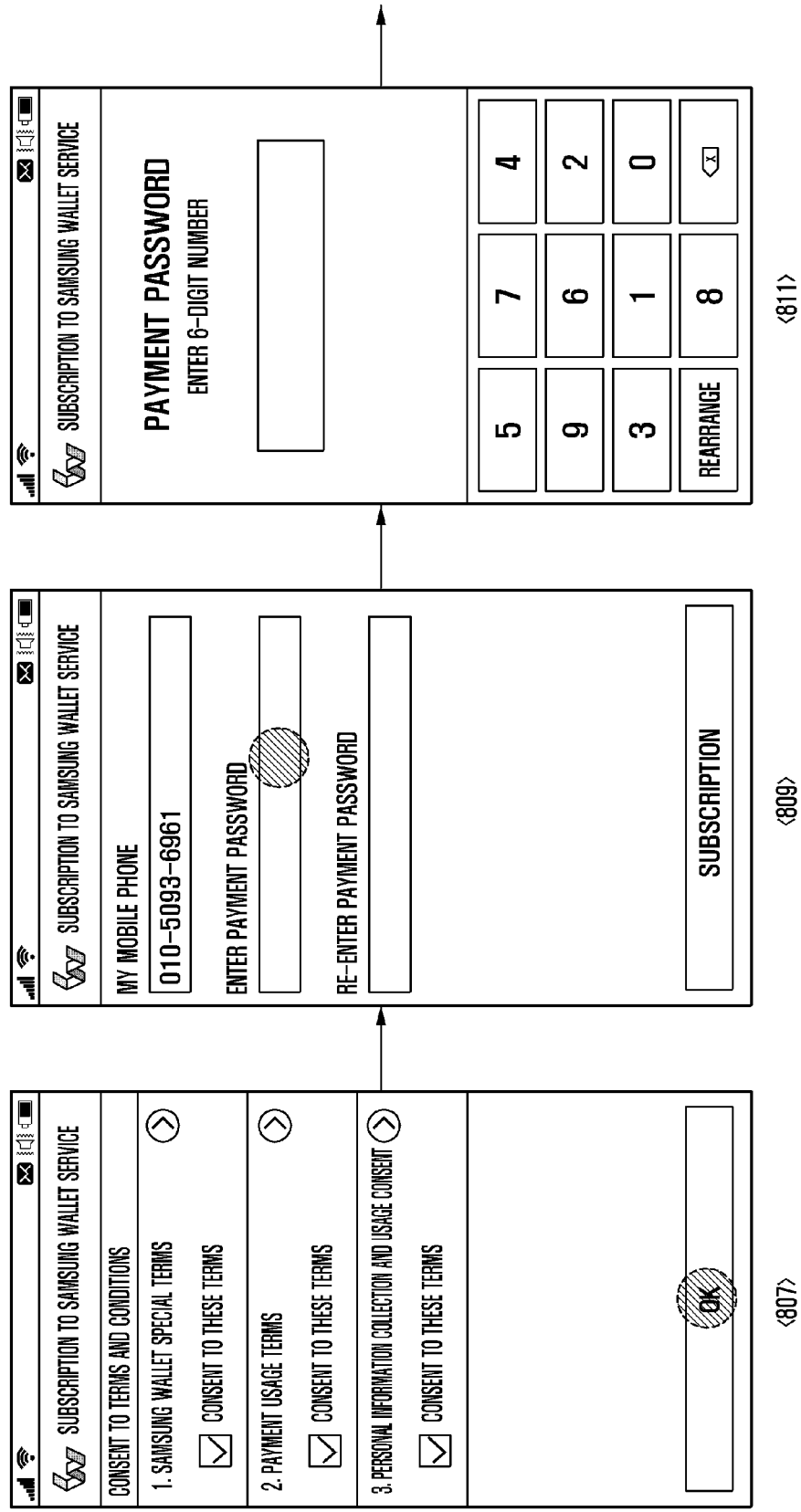

Referring to FIG. 8B, when all terms and conditions are checked ("OK") as in a screen 807, the terminal device 100 sends information on the checked items to the wallet server apparatus 200, which may provide a payment information registration screen to the terminal device 100. Then, the terminal device 100 may output in a screen 811, a password input window received from the wallet server apparatus 200. The phone number or serial number of the terminal device 100 may be automatically input to a password input field of the password input window. The phone number or serial number may also be manually input by the user.

When the password input field is selected in the screen in screen 809, the terminal device 100 may output a virtual keypad for password input at a region of the display unit 140 as in the screen 811.

Figure 9:
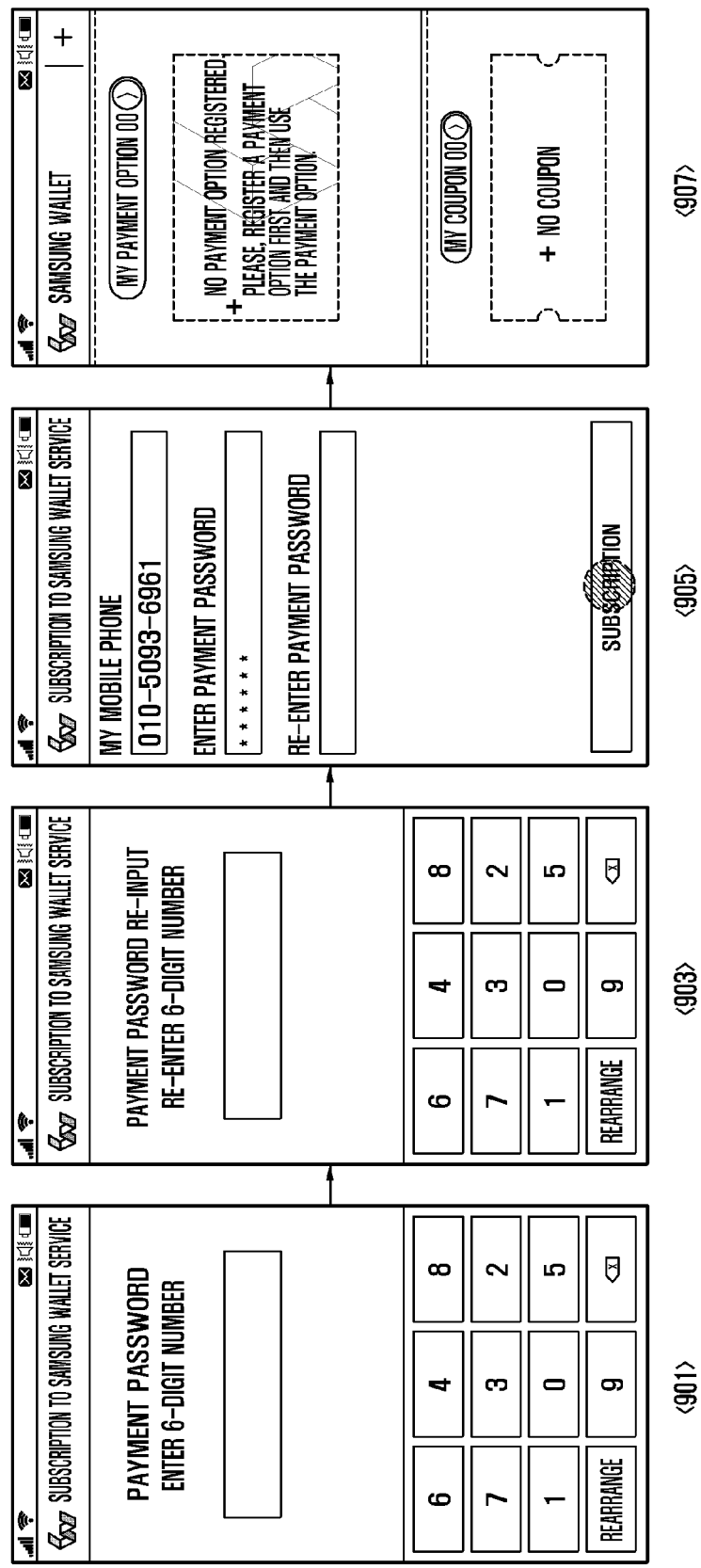

Referring to FIG. 9, when a password is input as in a screen 901, to ensure that the password is correct, the terminal device 100 may output a password verification window received from the wallet server apparatus 200 as in a screen 903. When password verification is successful, the terminal device 100 may output the input password as special characters for security in the corresponding field on the service subscription screen as in a screen 905. When a field "subscription" is selected on the screen 905, payment information registration is completed, and the terminal device 100 may output a wallet service home screen received from the wallet server apparatus 200 on the display unit 140 as in a screen 907.

Figure 10A:
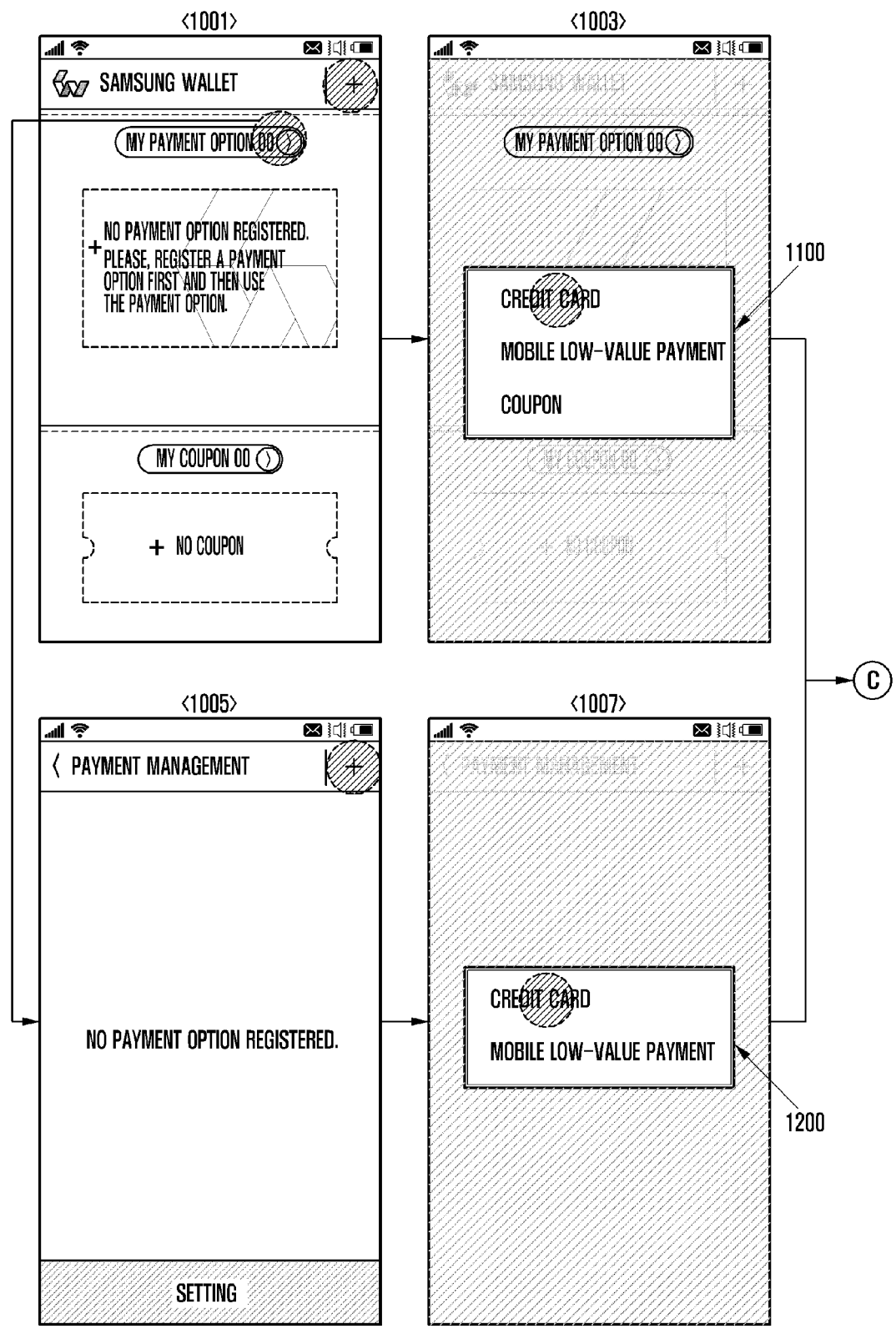

Referring to FIG. 10A, when an add button such as a '+' button is selected on the wallet service home screen as in a screen 1001, the terminal device 100 may output a first selection window 1100 for selection of payment options including a coupon as in a screen 1003.

Meanwhile, when an item "my payment options" is selected on the screen 1001 in a state where payment option registration is not performed yet, the terminal device 100 may output a screen 1005 indicating an absence of a registered payment option. When an add button is selected on the screen, the terminal device 100 may output a second selection window 1200 for selection of payment options not including a coupon as in a screen 1007.

Figure 10B:
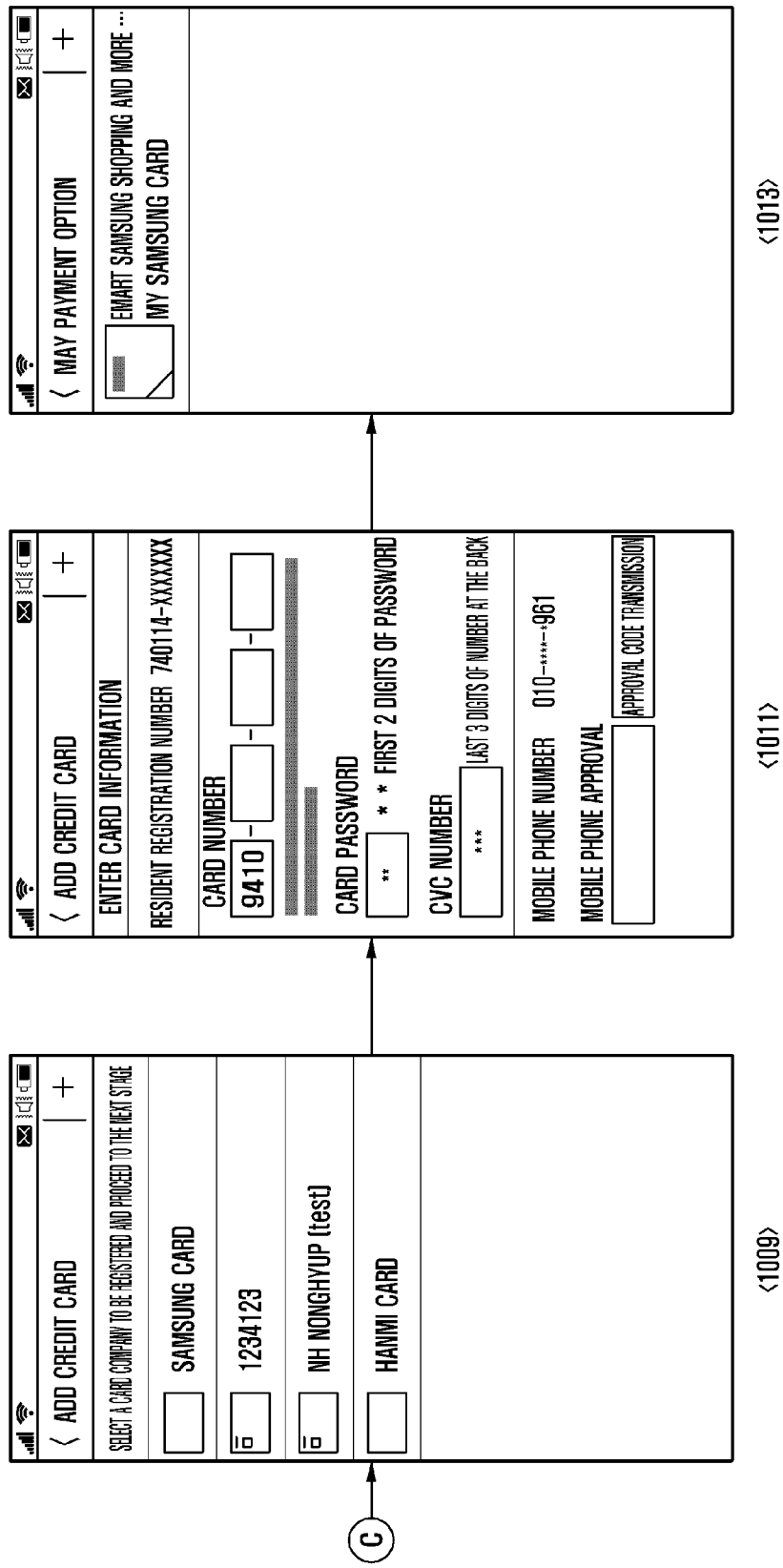

Referring to FIG. 10B, when an item "credit card" is selected on the first selection window 1100 or second selection window 1200, the terminal device 100 may output a card information input screen 1009. The card information input screen may contain a list of card issuing companies in partnership with the wallet service received from the wallet server apparatus 200. When the user selects a card issuing company (e.g. "Samsung Card") from the list, the terminal device 100 may output a web view screen 1011 for card information input. In this process, the terminal device 100 may check validity of input card information in cooperation with the financial support apparatus 500 associated with the selected card issuing company. In addition, the user may enter card information, password or other code information requested by the financial support apparatus 500 and the financial support apparatus 500 may verify the entered information.

Upon reception of an indication to completion of payment option registration from the wallet server apparatus 200, the terminal device 100 may output information on the issued credit card as my payment option as in a screen 1013. In this process, the financial support apparatus 500 may provide the payment option registration information to the wallet server apparatus 200, which may store the received payment option registration information and provide the same to the terminal device 100.

FIG. 11 is a sequence diagram illustrating a payment making procedure based on a wallet service according to an embodiment of the present disclosure.

Referring to FIG. 11, at operation 1101, a member store apparatus 400 sends a payment request for a product purchased by the terminal device 100 to the app server equipment 290. The terminal device 100 may connect to a server page hosted by the member store apparatus 400 and send a purchase request for a product to the member store apparatus 400. For example, the terminal device 100 may log in to the server page of the member store apparatus 400 and provide personal identification information such as an ID and password to the member store apparatus 400. The member store apparatus 400 sends the personal identification information such as an ID and password received from the terminal device 100 to the app server equipment 290. For payment support, the member store apparatus 400 may download and store a merchant wallet program from the wallet server apparatus 200 and subscribe to the wallet service in advance. The merchant wallet program is a version of the wallet program adapted for a vendor or store. For example, the merchant wallet program may include routines for validating information received from the terminal device 100 and forwarding the validated information to the wallet server apparatus 200 in a payment process.

Upon reception of a payment request from the member store apparatus 400, at operation 1103, the app server equipment 290 checks whether the member store apparatus 400 is subscriber of the wallet service. If the member store apparatus 400 is a subscriber of the wallet service, the app server equipment 290 proceeds to operation 1105 at which the app server equipment 290 sends terminal verification information and payment request information to the terminal verification server 280. If the member store apparatus 400 is not a subscriber of the wallet service, the app server equipment 290 may send a message recommending service subscription (not shown) to the member store apparatus 400.

Upon reception of terminal verification information and payment request information from the app server equipment 290, at operation 1107, the terminal verification server 280 checks whether the terminal device 100 is registered. If the terminal device 100 is registered, the terminal verification server 280 proceeds to operation 1109 at which terminal verification server 280 forwards the payment request information to the terminal device 100. If the terminal device 100 is not registered, the terminal verification server 280 may send a message indicating an unregistered terminal (not shown) to the app server equipment 290, which may forward the message indicating an unregistered terminal (not shown) to the member store apparatus 400 and the terminal device 100.

At operation 1111, the terminal device 100 receives the payment request information from the terminal verification server 280 and executes the wallet program. At operation 1113, the terminal device 100 sends a request for payment option information to the app server equipment 290. Payment option information may be card information and/or coupon information registered by a user in the app server equipment 290. In response to the request for payment option information, at operation 1115, the app server equipment 290 locates payment option information registered by the terminal device 100 and sends the payment option information to the terminal device 100. Upon reception of payment option information, the terminal device 100 may output the payment option information on the display unit 140. The terminal device 100 may output a list of cards or coupons. At operation 1117, the terminal device 100 receives user input for selecting a card and/or other coupon as a payment option and entering PIN information (preregistered in the app server equipment 290).

When no payment option is included in the payment option information, the app server equipment 290 may send a message recommending payment option registration (not shown) to the terminal device 100. In response to the message, the terminal device 100 may perform a procedure for payment option registration (not shown) according to user control.

Upon reception of user input for payment option selection and PIN information, at operation 1119, the terminal device 100 sends payment information to the app server equipment 290. At operation 1121, the app server equipment 290 checks whether the received PIN information matches the PIN information preregistered for the terminal device 100 and sends, if the received PIN information matches the preregistered PIN information, a payment approval request to the financial support apparatus 500. If the received PIN information does not match the preregistered PIN information, the app server equipment 290 may notify the terminal device 100 of a PIN error and request the terminal device 100 to reenter PIN information (not shown). When the number of times of PIN input failure exceeds a preset value, the app server equipment 290 may prohibit use of the related payment option, use of the registration information of the terminal device 100 or use of the account created for a terminal device 100 according to preset policies. This prohibition may be enforced by the financial support apparatus 500 rather than the app server equipment 290.

Upon reception of a payment approval request from the app server equipment 290, at operation 1123, the financial support apparatus 500 verifies payment approval information. The financial support apparatus 500 may check validity of the card information and PIN information sent by the app server equipment 290. Validity of the PIN information may be checked by the app server equipment 290 rather than the financial support apparatus 500. To check whether the terminal device 100 is registered as a payment terminal, the financial support apparatus 500 may send a push message (not shown) to the terminal device 100 and examine a corresponding response message (not shown) from the terminal device 100. The terminal device 100 may process such a push message in the background without display. Upon successful validation, at operation 1125, the financial support apparatus 500 sends an approval completion message to the app server equipment 290.

Upon reception of an approval completion message, at operation 1127, the app server equipment 290 forwards the approval completion message to the member store apparatus 400. The approval completion message may include a payment statement.

Figure 13:
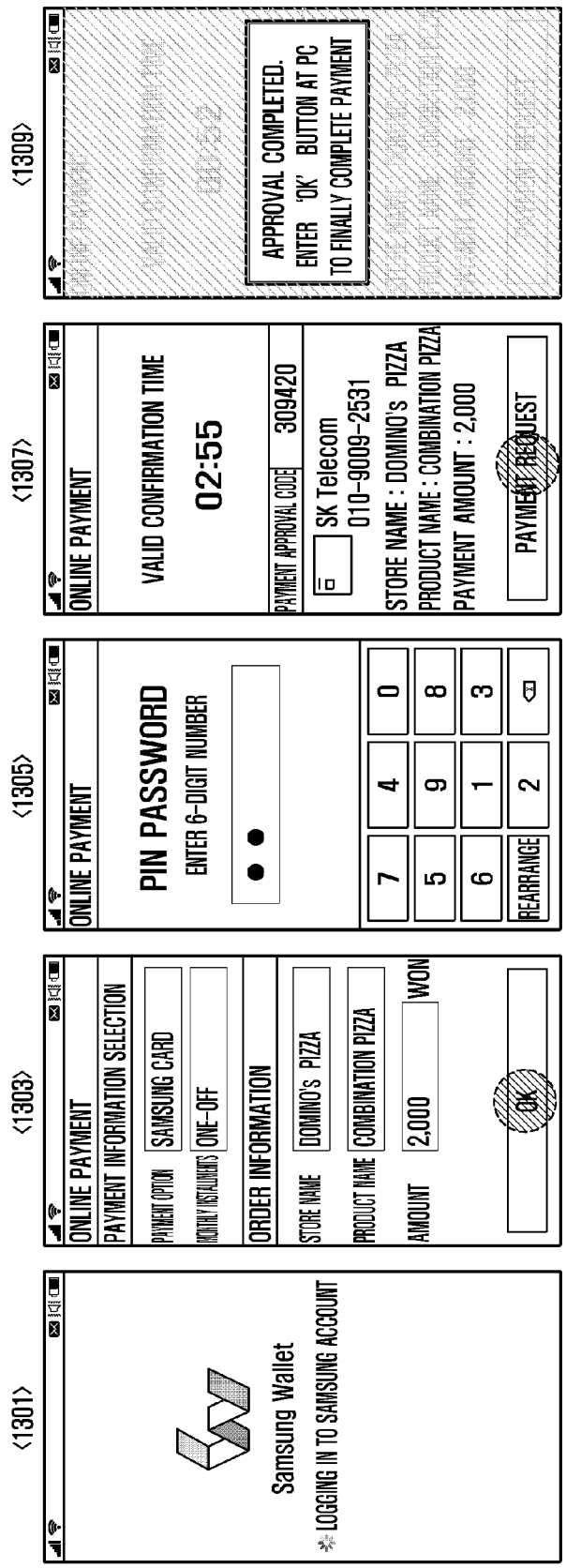

FIGS. 12 and 13 illustrate screen representations for a payment making procedure based on a wallet service according to an embodiment of the present disclosure. The procedure described in FIGS. 12 and 13 may be performed jointly by a desktop computer and a mobile terminal serving as a terminal device 100 of the present disclosure. Screen representations in FIG. 12 may be related to the desktop computer, and screen representations in FIG. 13 may be related to the mobile terminal.

Referring to FIG. 12, in response to user input, a desktop computer may connect to a server page hosted by a member store apparatus 400 operated by a pizza store. The desktop computer may output a pizza menu screen 1201 received from the member store apparatus 400 on the display unit 140. When the user generates an input event for selecting desired pizza on the pizza menu screen, the desktop computer sends information on the selected product to the member store apparatus 400. The desktop computer may output a discount coupon screen 1203. For example, the desktop computer may maintain information on discount coupons owned by the user and output guidance information on use of a discount coupon when a member store apparatus 400 accepting the discount coupon is connected.

Upon completion of product and coupon selection, the desktop computer may output a screen 1205 containing selection information and a field for payment initiation. When the field for payment initiation is selected by the user, the desktop computer may output a screen 1207 for verifying personal identification information received from the member store apparatus 400. The member store apparatus 400 may request input of information on a mobile terminal registered for payment. The user may enter mobile terminal information using an input unit or the like.

Upon reception of mobile terminal information from the desktop computer, the member store apparatus 400 sends a payment approval request to the app server equipment 290. The payment approval procedure is depicted in FIG. 13. Upon reception of an approval completion response from the financial support apparatus 500, the member store apparatus 400 may provide a page containing information on approval completion and product delivery to the desktop computer, which displays the received page as in a screen 1209. When the policy of the financial support apparatus 500 requires final user confirmation, the desktop computer may output a window for obtaining user confirmation. When user confirmation is obtained, the desktop computer may output the screen.

In the above description, a desktop computer rather than a mobile terminal is used to make a purchase and payment. However, the present disclosure is not limited thereto. For example, a smart TV or other electronic appliance supporting bidirectional communication may be utilized instead of a desktop computer.

The app server equipment 290 may perform a payment approval procedure in cooperation with a mobile terminal whose information is provided during a purchase and payment process initiated by a desktop computer. In the following description, a mobile terminal is referred to as a terminal device 100.

Referring to FIG. 13, upon reception of a confirmation request from the app server equipment 290 according to the personal identification information and terminal selection information entered by the desktop computer for handling a payment approval request, the terminal device 100 may automatically activate the wallet program and output a login screen. When the user successfully enters login information, the terminal device 100 may output a login progress indication on the display unit as in a screen 1301. Upon login completion, the terminal device 100 sends a request for payment option information to the app server equipment 290 of the wallet server apparatus 200, and receives registered payment option information and outputs the payment option information as in a screen 1303. For example, the terminal device 100 may output a screen containing a payment information selection region for a payment option and monthly installments and an order information region. The order information region may be filled in by the app server equipment 290 based on information of a purchased product sent by the member store apparatus 400.

If information elements on the screen 1303 match the product to buy, the user may enter a confirmation input to thereby proceed to the next stage. Upon reception of a confirmation input, the terminal device 100 may output a PIN input request (corresponding to the selected payment option) received from the app server equipment 290 as in a screen 1305. When PIN information is input, the app server equipment 290 sends payment approval information such as information on the payment option, PIN and purchase value to the financial support apparatus 500. The financial support apparatus 500 validates the received information and sends a final confirmation request to the terminal device 100, which may output the final confirmation request as in a screen 1307. The financial support apparatus 500 may set a time limit to final confirmation of the user. For example, the financial support apparatus 500 may set a time limit of three minutes to user confirmation. The user may review the displayed information and make a confirmation by issuing a payment request within the confirmation time limit. The terminal device 100 sends user confirmation information to the financial support apparatus 500. After completion of payment approval, the financial support apparatus 500 sends a payment approval completion indication to the terminal device 100 and may send the the payment approval completion indication to the desktop computer having initiated the payment making procedure. The terminal device 100 outputs a payment approval completion screen as in a screen 1309, and may output a guide message requesting final confirmation at the terminal device having initiated the payment making procedure (e.g. the desktop computer) according to the policy set by the financial support apparatus 500.

Figure 14:
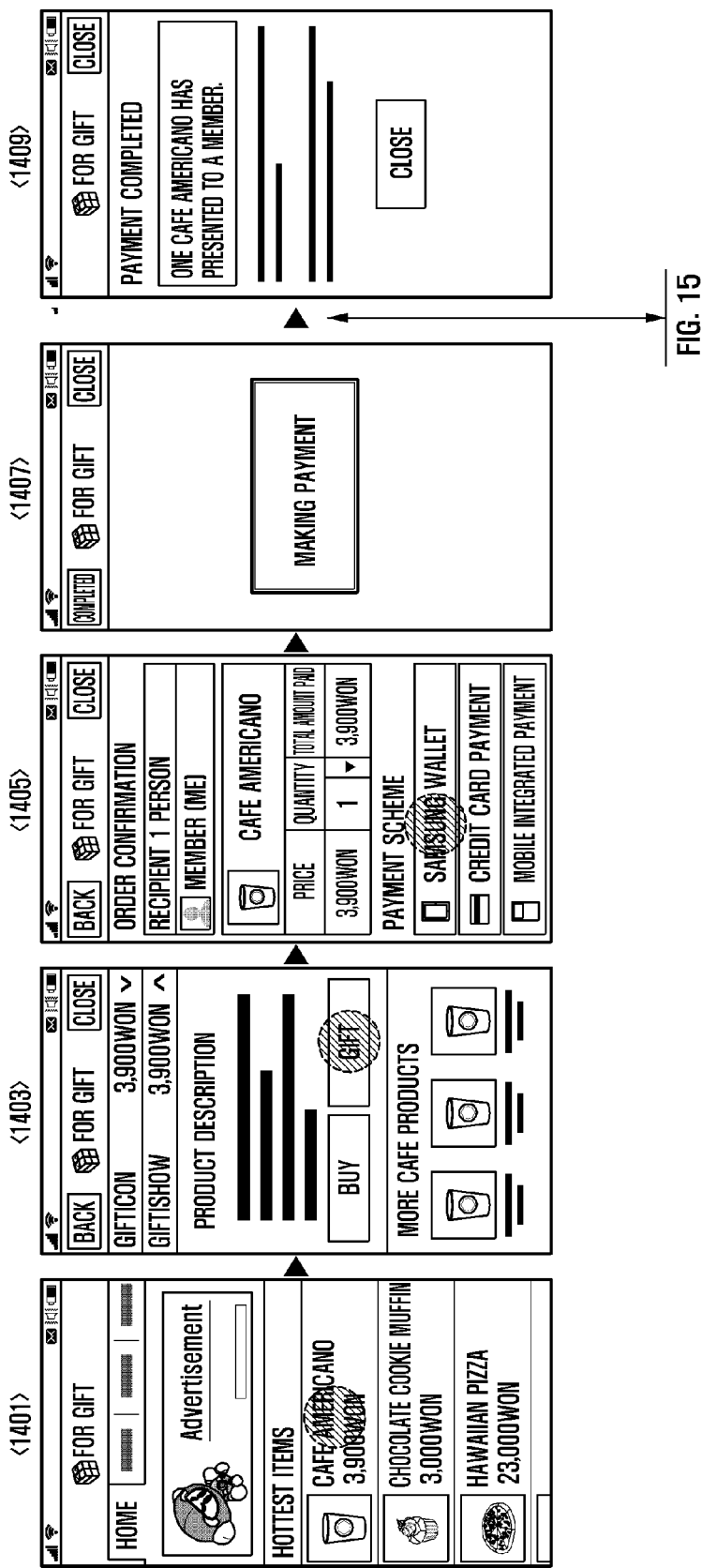
Figure 15:
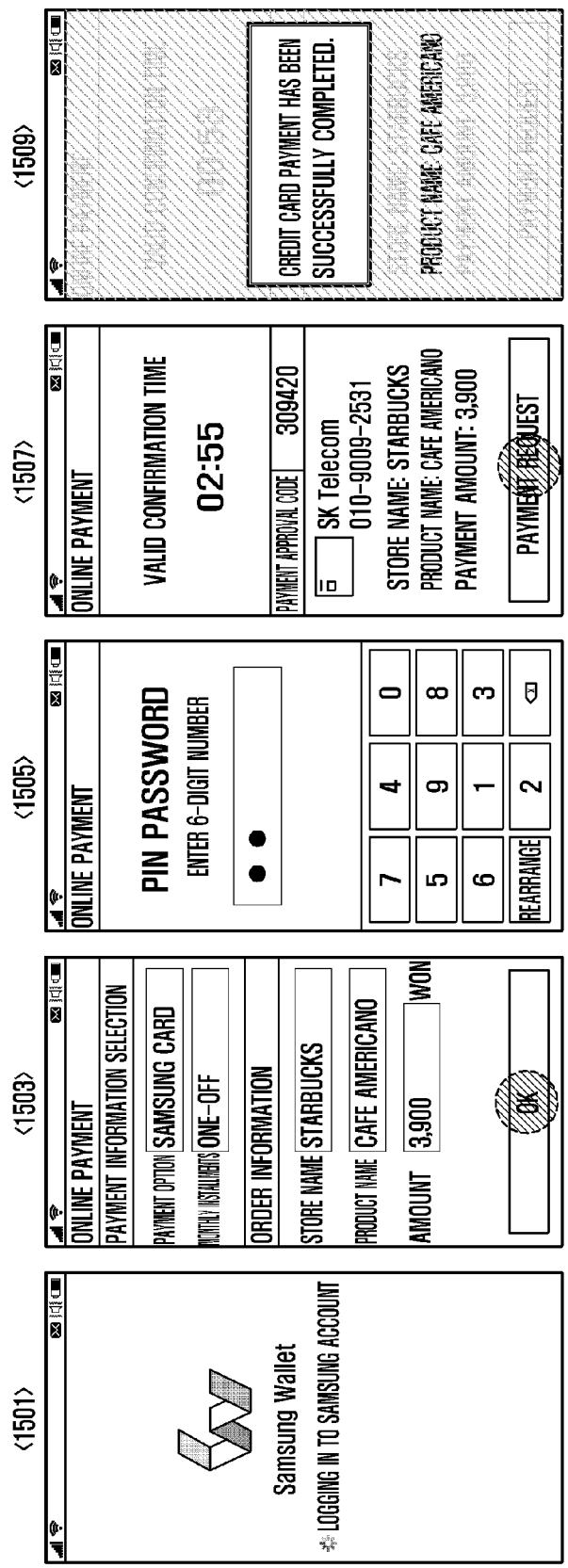

FIGS. 14 and 15 illustrate screen representations for another payment making procedure based on a wallet service according to an embodiment of the present disclosure. The procedure described in FIGS. 14 and 15 is performed by one terminal device making a purchase request and making a payment confirmation.

Referring to FIG. 14, the user may use the terminal device 100 to connect to a server page hosted by a member store apparatus 400 operated by a merchant store. The terminal device 100 may output the server page received from the member store apparatus 400 as in a screen 1401. The user may browse various items on the server page and select a particular item. The terminal device 100 may receive a screen describing selectable actions applicable to the selected item (e.g., purchase or presentation as a gift) from the member store apparatus 400 and output the received screen as in a screen 1403.

When the user selects an item "gift", the terminal device 100 may send information on the selected item to the member store apparatus 400. The member store apparatus 400 may send a page containing a short description of the selected product and a payment option region for payment option selection to the terminal device 100. Upon reception of the page, the terminal device 100 may output the received page as in a screen 1405. The member store apparatus 400 may be a device registered in the wallet server apparatus 200, and hence may insert an item for a payment option based on the wallet service in the payment option region. When the user selects a payment option based on the wallet service, the terminal device 100 may support a payment procedure using an individual identification value. For example, the terminal device 100 may output various items describing the progress of payment as in a screen 1407. Upon completion of payment, the terminal device 100 may output a screen indicating payment completion as in a screen 1409. The progress of payment is described in more detail with reference to FIG. 15.

Referring to FIG. 15, when the app server equipment 290 receives a request for payment based on a selected payment option, it may provide various screen data for payment approval to the terminal device 100. Accordingly, the terminal device 100 may output various screens for payment approval, such as a screen 1501 for account login after activation of the wallet program, a screen 1503 for payment option selection, a screen 1505 for PIN input, a screen 1507 for entering a "one time approval code" given by the financial support apparatus 500 or app server equipment 290 within a time limit, and a screen 1509 indicating payment completion after user confirmation. The user may enter requested information (identical to the information preregistered in the wallet server apparatus 200 or the financial support apparatus 500) in the above screens.

Figure 16:
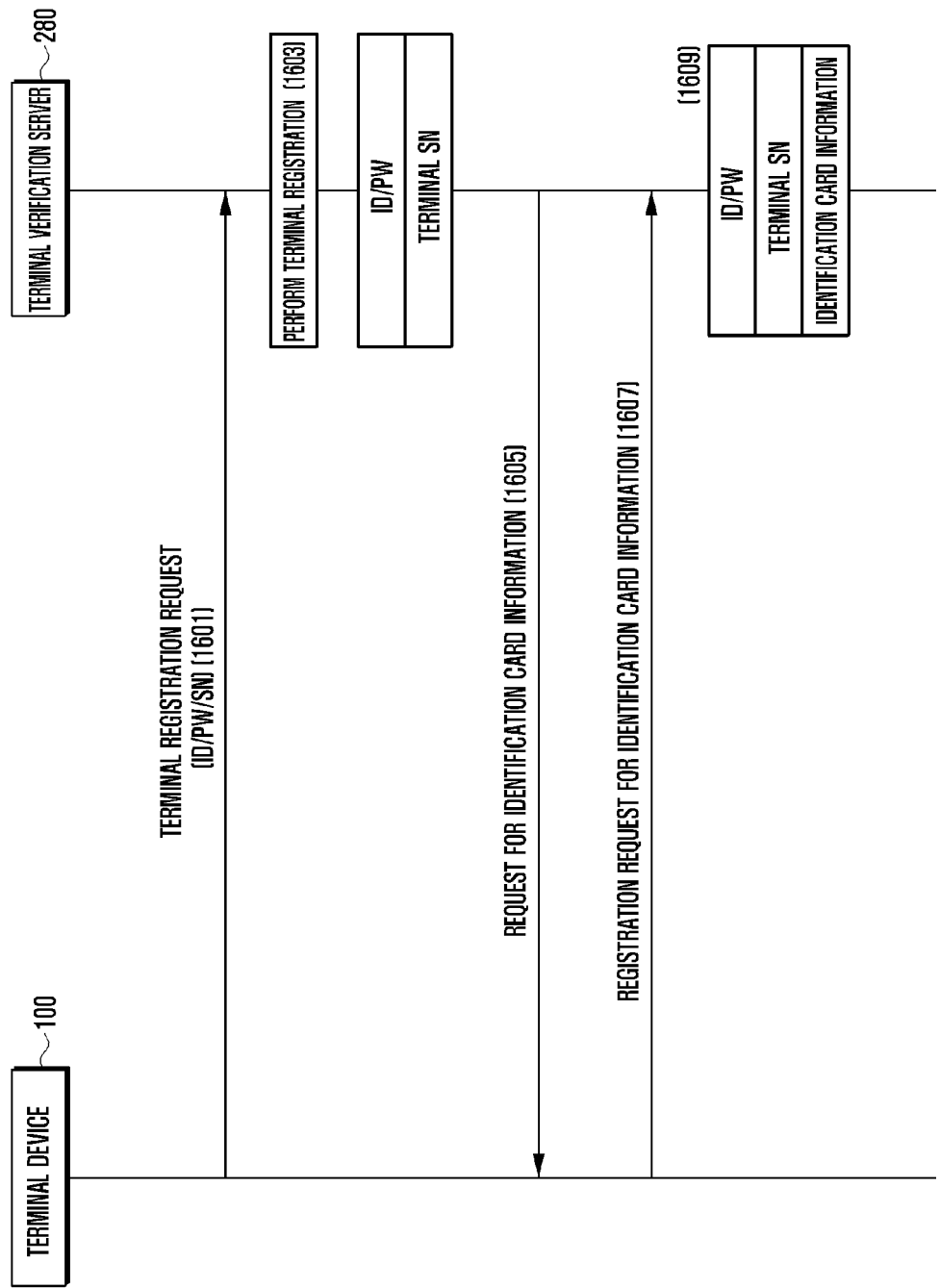
FIG. 16 is a sequence diagram illustrating a procedure for terminal registration based on an identification card according to an embodiment of the present disclosure.

FIG. 16 is a sequence diagram illustrating a procedure for identification card registration according to an embodiment of the present disclosure.

Referring to FIG. 16, the terminal device 100 may register payment information at an account provided by the wallet server apparatus 200. To this end, the terminal device 100 may install the wallet program and activate the wallet program to connect to the wallet server apparatus 200 by entering login information to a login page of the wallet server apparatus 200. The terminal device 100 may register itself to the account associated with the login information. When no account is present, the terminal device 100 may output an account creation screen for entering user information such as registration number or address. For terminal registration, at operation 1601, the terminal device 100 sends a terminal registration request to the terminal verification server 280. The terminal registration request may contain an ID, password and terminal serial number. Alternatively, the terminal device 100 may log in to the account first by entering an ID and password, and enter the terminal serial number through a page provided by the wallet server apparatus 200.

Upon reception of a terminal registration request from the terminal device 100, at operation 1603, the terminal verification server 280 performs terminal registration. For example, the terminal verification server 280 stores the ID, password and serial number in an interrelated manner in the storage unit. At operation 1605, the terminal verification server 280 sends a request for identification card information to the terminal device 100. Upon reception of the request, the terminal device 100 outputs a screen for entering identification card information. The user enters identification card information verified by the wallet server apparatus 200. For example, to use a wallet service, the user may obtain an identification card issued by an organization operating the wallet server apparatus 200, and register the identification card at a specific account managed by the wallet server apparatus 200. At operation 1607, the terminal device 100 sends identification card information registered to the terminal verification server 280. Upon reception of the identification card information, at operation 1609, the terminal verification server 280 stores and manages the ID, password, serial number and identification card information in an interrelated manner.

Figure 17:
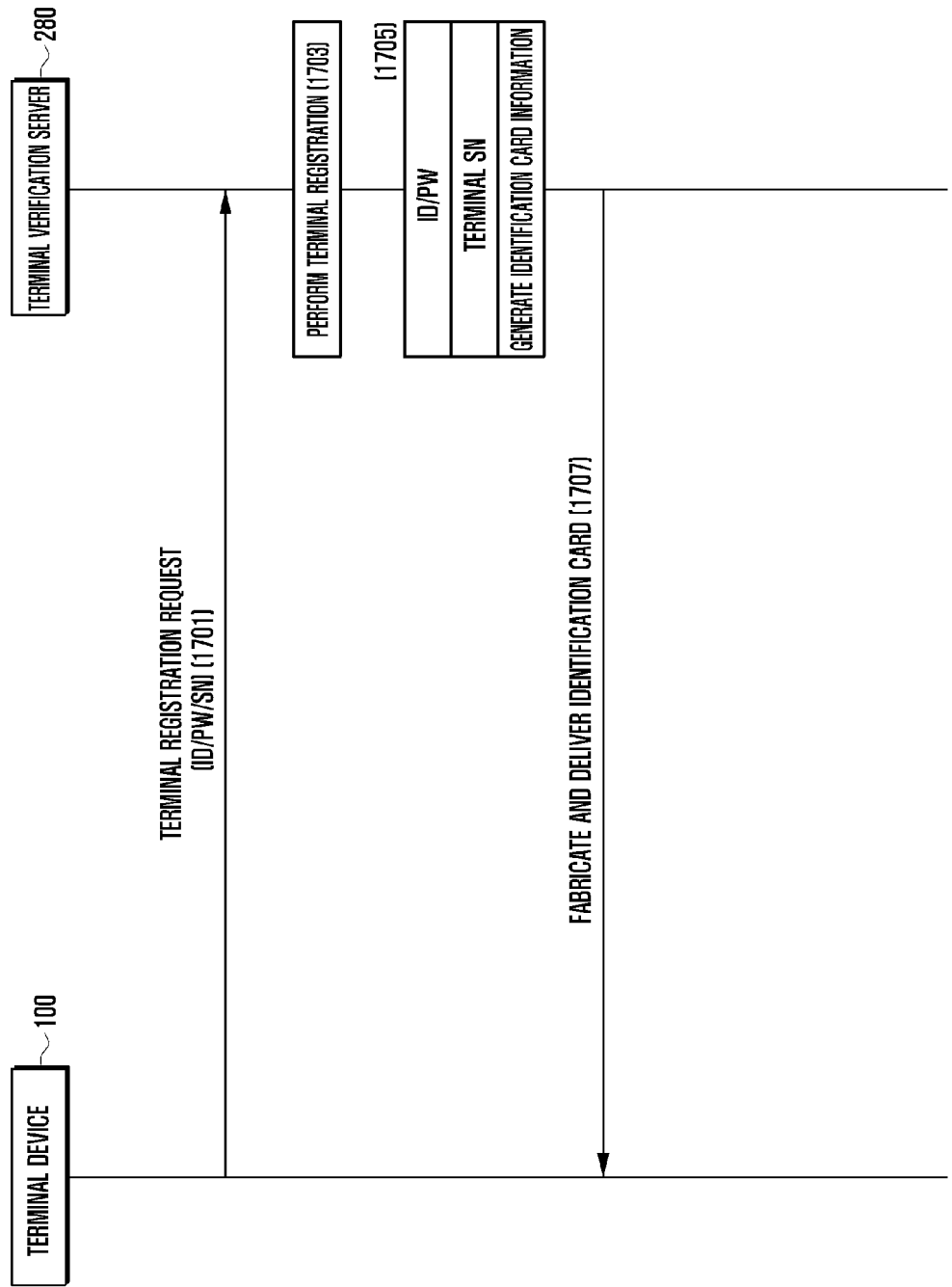
FIG. 17 is a sequence diagram illustrating another procedure for terminal registration based on an identification card according to an embodiment of the present disclosure.

FIG. 17 is a sequence diagram illustrating another procedure for identification card registration according to an embodiment of the present disclosure.

Referring to FIG. 17, in response to selection of the wallet program, the terminal device 100 activates the wallet program and output a screen for login to the wallet server apparatus 200 on the display unit. When the user enters login information, at operation 1701, the terminal device 100 may send a terminal registration request containing the login information and terminal serial number to the terminal verification server 280 of the wallet server apparatus 200.

Upon reception of the terminal registration request, at operation 1703, the terminal verification server 280 performs terminal registration. At operation 1705, the terminal verification server 280 generates identification card information according to the ID, password, and terminal serial number contained in the terminal registration request, and stores and manages the identification card information, ID, password and terminal serial number in an interrelated manner.

At operation 1707, the terminal verification server 280 may support fabrication of an identification card corresponding to the identification card information and support delivery of the identification card to the terminal device 100.

Figure 18:
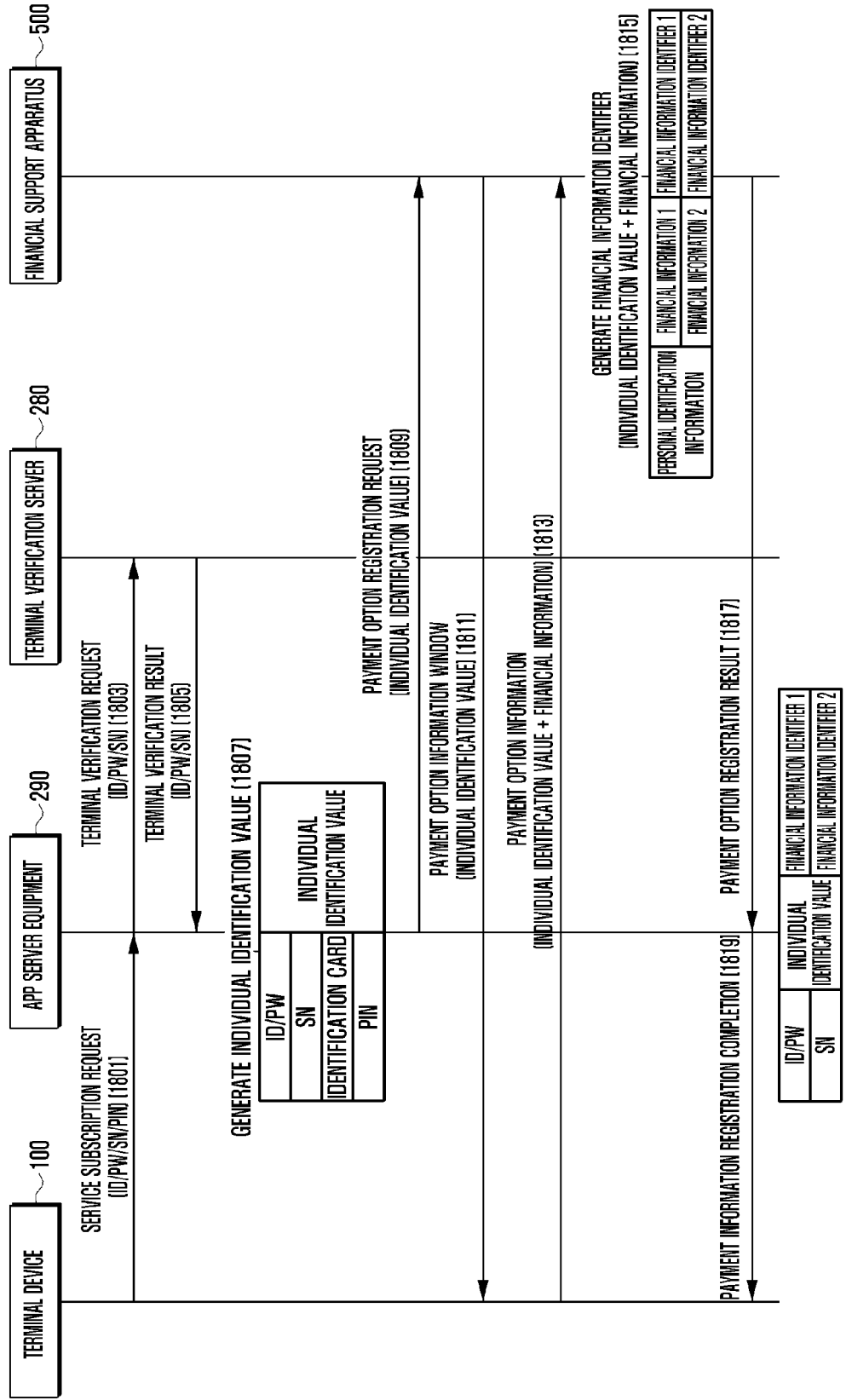
FIG. 18 is a sequence diagram illustrating a procedure for payment information registration based on an identification card according to an embodiment of the present disclosure.

FIG. 18 is a sequence diagram illustrating a procedure for payment information registration based on an identification card according to an embodiment of the present disclosure.

Referring to FIG. 18, to register payment information using an identification card, at operation 1801, the terminal device 100 sends a service subscription request to the app server equipment 290. The service subscription request may contain an ID, password, terminal serial number and PIN information. The terminal device 100 may output an input window for entering ID, password and terminal serial number first, and output an input window for entering PIN information.

Upon reception of a service subscription request from the terminal device 100, at operation 1803, the app server equipment 290 sends a terminal verification request to the terminal verification server 280. The terminal verification request may contain the ID, password and terminal serial number. The terminal verification server 280 verifies whether the information contained in the terminal verification request matches the preregistered information. At operation 1805, the terminal verification server 280 sends a terminal verification result to the app server equipment 290.

When the terminal verification result indicates that the terminal device 100 is valid, at operation 1807, the app server equipment 290 generates an individual identification value, and stores and manages the individual identification value, ID, password, terminal serial number, identification card information and PIN information in an interrelated manner. The identification card information may be received from the terminal device 100, or an identification card may be fabricated and sent together with identification card information to the terminal device 100.

At operation 1809, the app server equipment 290 sends a payment option registration request containing the individual identification value to the financial support apparatus 500. At operation 1811, the financial support apparatus 500 sends a payment option information window containing the individual identification value to the terminal device 100. The terminal device 100 outputs the payment option information window and receives payment option information entered by the user. For example, the user may enter financial information including card information in the payment option information window. At operation 1813, the terminal device 100 sends payment option information including an individual identification value and financial information to the financial support apparatus 500.

At operation 1815, the financial support apparatus 500 generates a financial information identifier based on the received individual identification value and financial information, and maintains the financial information identifier. Multiple financial information identifiers may be generated. For example, for a given individual identification value, the financial support apparatus 500 may associate one financial information identifier with one piece of financial information. When multiple pieces of card information are registered, multiple financial information identifiers are associated respectively with multiple pieces of financial information.

At operation 1817, the financial support apparatus 500 sends a payment option registration result to the app server equipment 290. The app server equipment 290 may store at least one financial information identifier and other information such as ID, password, terminal serial number and individual identification value in an interrelated manner. At operation 1819, the app server equipment 290 notifies the terminal device 100 of payment information registration completion depending upon the received payment option registration result.

Figure 19:
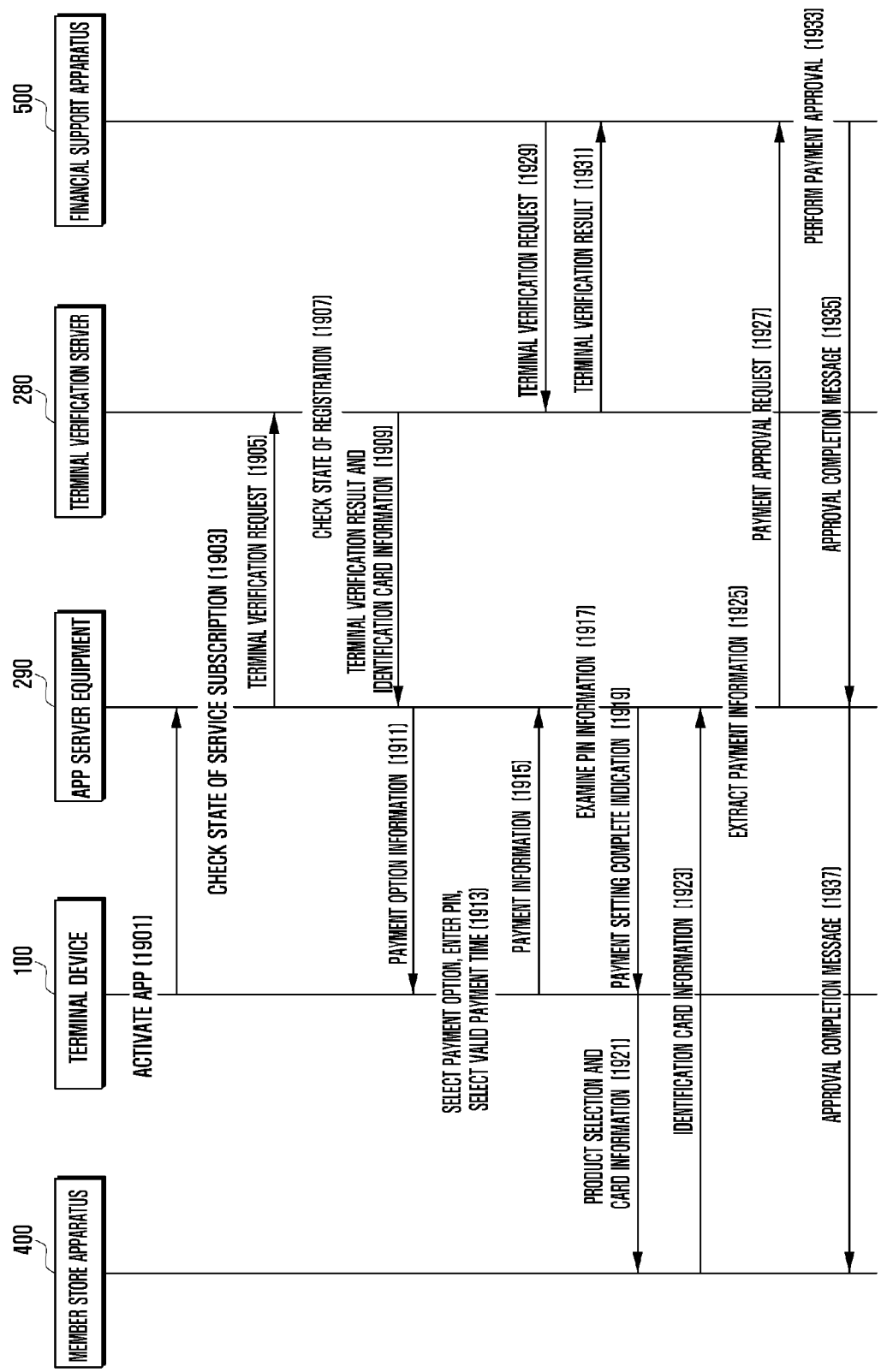
FIG. 19 is a sequence diagram illustrating a payment making procedure based on an identification card according to an embodiment of the present disclosure.

FIG. 19 is a sequence diagram illustrating a payment making procedure based on an identification card according to an embodiment of the present disclosure.

Referring to FIG. 19, at operation 1901, the terminal device 100 activates the wallet program and connects to the app server equipment 290. At operation 1903, the app server equipment 290 checks whether the terminal device 100 is a subscriber of the service. When the terminal device 100 is a subscriber, the app server equipment 290 proceeds to operation 1905 at which the app server equipment 290 sends a terminal verification request to the terminal verification server 280. At operation 1907, the terminal verification server 280 checks whether the terminal device 100 is registered based on terminal information such as ID, password and serial number. At operation 1909, the terminal verification server 280 sends a terminal verification result and identification card information registered for the terminal device to the app server equipment 290.

When the terminal device 100 is determined to be registered, at operation 1911, the app server equipment 290 sends payment option information to the terminal device 100. Upon reception of payment option information, at operation 1913, the terminal device 100 outputs the payment option information and receives user input for selecting a payment option and entering PIN information. Additionally, the terminal device 100 may support selection of a valid payment time and receive user input for selecting a valid payment time. At operation 1915, the terminal device 100 sends payment information related to a payment option, PIN information and valid payment time to the app server equipment 290. At operation 1917, the app server equipment 290 checks whether the received PIN information matches the preregistered PIN information. At operation 1919, the app server equipment 290 sends a payment setting complete indication to the terminal device 100. At operation 1921, the terminal device 100 selects a desired one of products provided by the member store apparatus 400 and sends identification card information to the member store apparatus 400. The identification card information may be provided through a plastic card, through short-range communication as electronic information, or through a tag having identification card information and a reader attached to the member store apparatus 400.

At operation 1923, the member store apparatus 400 sends product information and identification card information entered by the user to the app server equipment 290. The app server equipment 290 may check whether the received identification card information is identical to the identification card information provided by the terminal verification server 280. At operation 1925, the app server equipment 290 extracts payment information including payment option information, PIN information and product information from the information provided by the member store apparatus 400. At operation 1927, the app server equipment 290 sends a payment approval request containing the payment information to the financial support apparatus 500.

At operation 1933, when information contained in the received payment approval request matches the preregistered information, the financial support apparatus 500 performs payment approval. At operation 1935, the financial support apparatus 500 sends a payment approval completion message to the app server equipment 290. At operation 1937, the app server equipment 290 forwards the payment approval completion message to the member store apparatus 400, which may send a payment approval completion indication to the terminal device 100.

Figure 20:
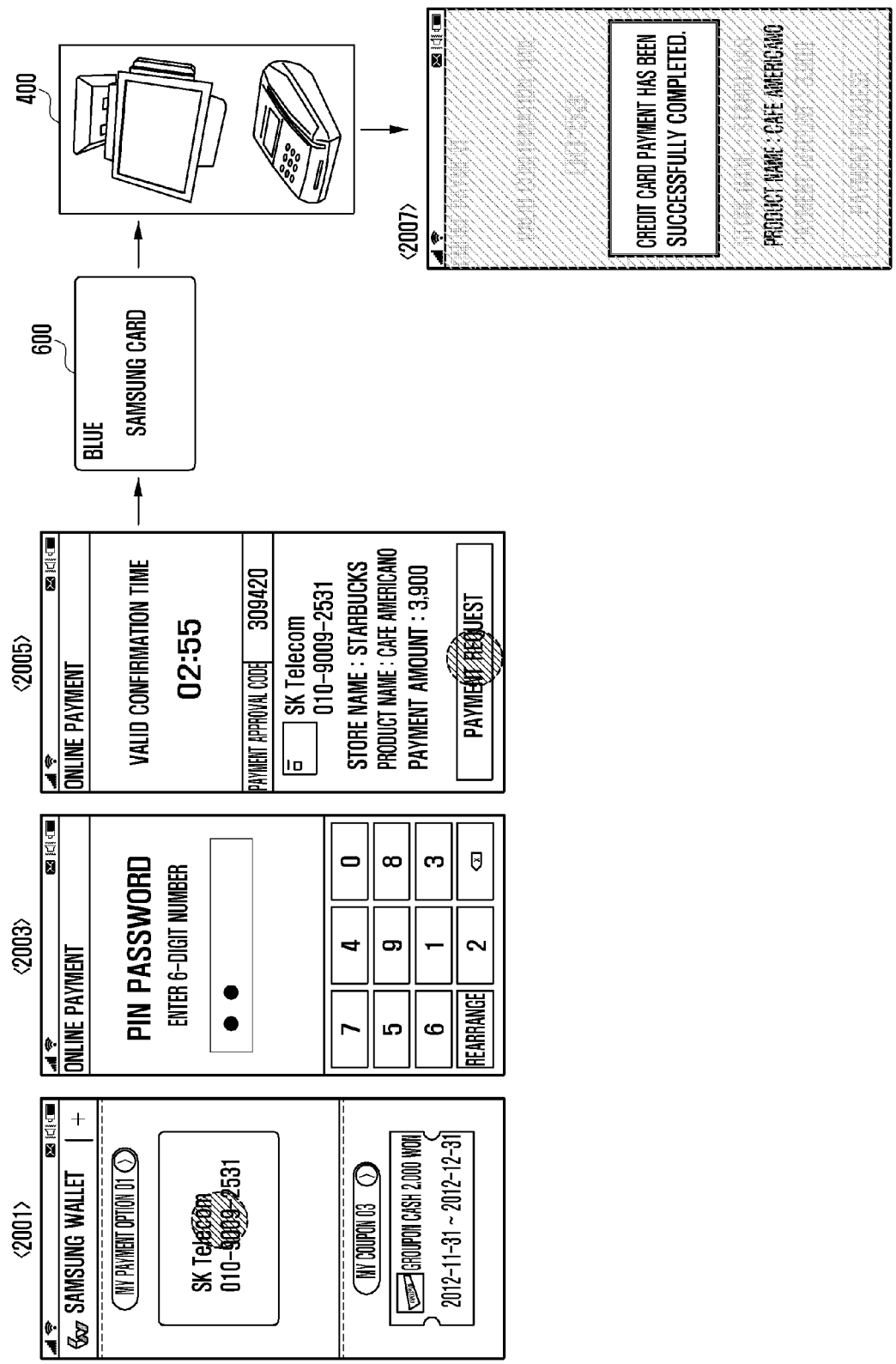
FIG. 20 illustrates screen representations of a payment making procedure based on an identification card according to an embodiment of the present disclosure.

FIG. 20 illustrates screen representations of a payment making procedure based on an identification card according to an embodiment of the present disclosure.

Referring to FIG. 20, upon activation of the wallet program and login completion, the terminal device 100 may output a screen 2001 containing payment option and coupon information. When the user selects a payment option on the screen, the terminal device 100 may output a PIN input window received from the app server equipment 290 as in a screen 2003. Upon successful PIN input, the app server equipment 290 may send information provided by the terminal device 100, personal identification information and identification card information to the financial support apparatus 500.

To verify the terminal owner, the financial support apparatus 500 sends a screen containing a payment approval code and a time limit to the terminal device 100, which outputs a screen 2005. The user may initiate the payment procedure by entering payment request input within the time limit.

To limit the usage time of an identification card 600, the user of the terminal device 100 may send a request for setting a valid payment time to the financial support apparatus 500 or the wallet server apparatus 200. The user presents the preregistered identification card 600 to the member store apparatus 400. The identification card information collected by the member store apparatus 400 is treated as effective when the identification card information is sent to the financial support apparatus 500 or the wallet server apparatus 200 within the valid payment time set by the user. The valid payment time may indicate the time taken from completion of payment approval to recognition of the identification card 600 by a member store apparatus. Similarly to the valid confirmation time, the valid payment time may be output or not output on the display unit of a terminal device according to design.

The member store apparatus 400 may obtain information contained in the identification card 600 using a reader and send the identification card information to the wallet server apparatus 200 through a communication network. The wallet server apparatus 200 may verify the received identification card information and send a payment approval request to the financial support apparatus 500. The wallet server apparatus 200 may not verify the received identification card information and may forward the identification card information to the financial support apparatus 500. Alternatively, the member store apparatus 400 may directly provide the identification card information and product purchase information to the financial support apparatus 500. Upon reception of a payment approval completion message from the financial support apparatus 500, the app server equipment 290 may send the payment approval completion message to at least one of the member store apparatus 400 and the terminal device 100 as in a screen 2007.

When the user selects a desired product from the server page of the member store apparatus 400, the terminal device 100 may activate the wallet program and output a screen 2001.

Figure 21:
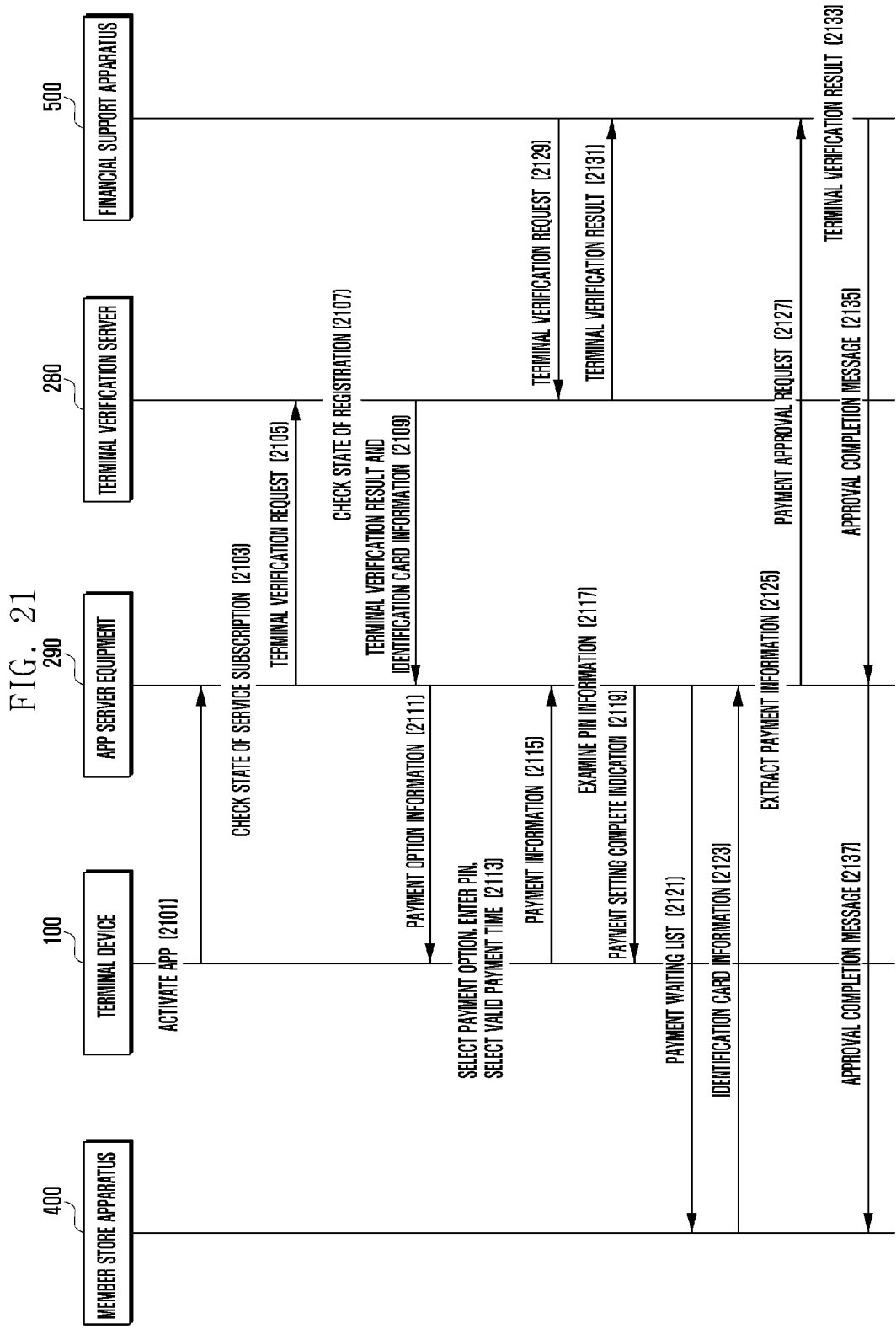
FIG. 21 is a sequence diagram illustrating another payment making procedure based on an identification card according to an embodiment of the present disclosure.

FIG. 21 is a sequence diagram illustrating another payment making procedure based on an identification card according to an embodiment of the present disclosure. As the procedure depicted in FIG. 21 is similar to that of FIG. 19 except for use of a payment waiting list, a relatively brief description thereof is given.

Referring to FIG. 21, at operation 2101, the terminal device 100 activates the wallet program 151 and connects to the app server equipment 290. At operation 2103, the app server equipment 290 checks whether the terminal device 100 is a subscriber of the service. When the terminal device 100 is a subscriber, the app server equipment 290 proceeds to operation 2105 at which the app server equipment 290 sends a terminal verification request to the terminal verification server 280. At operation 2107, the terminal verification server 280 checks whether the terminal device 100 is registered based on the preregistered information. At operation 2109, the terminal verification server 280 sends a terminal verification result and registered identification card information to the app server equipment 290.

At operation 2111, the app server equipment 290 sends payment option information for payment option selection to the terminal device 100. At operation 2113, the terminal device 100 may output the payment option information and receives user input for selecting a payment option, entering PIN information and selecting a valid payment time. At operation 2115, the terminal device 100 sends payment information related to a payment option, PIN information and valid payment time to the app server equipment 290. At operation 2117, the app server equipment 290 checks whether the received PIN information matches the preregistered PIN information. When a match is found, at operation 2119, the app server equipment 290 sends a payment setting complete indication to the terminal device 100. At operation 2121, the app server equipment 290 sends a payment waiting list to the member store apparatus 400.

The terminal device 100 presents identification card information to the member store apparatus 400. At operation 2123, the member store apparatus 400 sends the identification card information to the app server equipment 290. At operation 2125, the app server equipment 290 extracts payment information corresponding to the identification card information such as financial information (financial information identifier) mapped with the identification card. At operation 2127, the app server equipment 290 sends a payment approval request containing the payment information to the financial support apparatus 500.

At operation 2129, the financial support apparatus 500 sends a terminal verification request to the terminal verification server 280. At operation 2131, the financial support apparatus 500 receives a terminal verification result from the terminal verification server 280.

At operation 2133, when information contained in the received payment approval request is valid, the financial support apparatus 500 performs payment approval. At operation 2135, the financial support apparatus 500 sends a payment approval completion message to the app server equipment 290. At operation 2137, the app server equipment 290 forwards the payment approval completion message to the member store apparatus 400.

Figure 22:
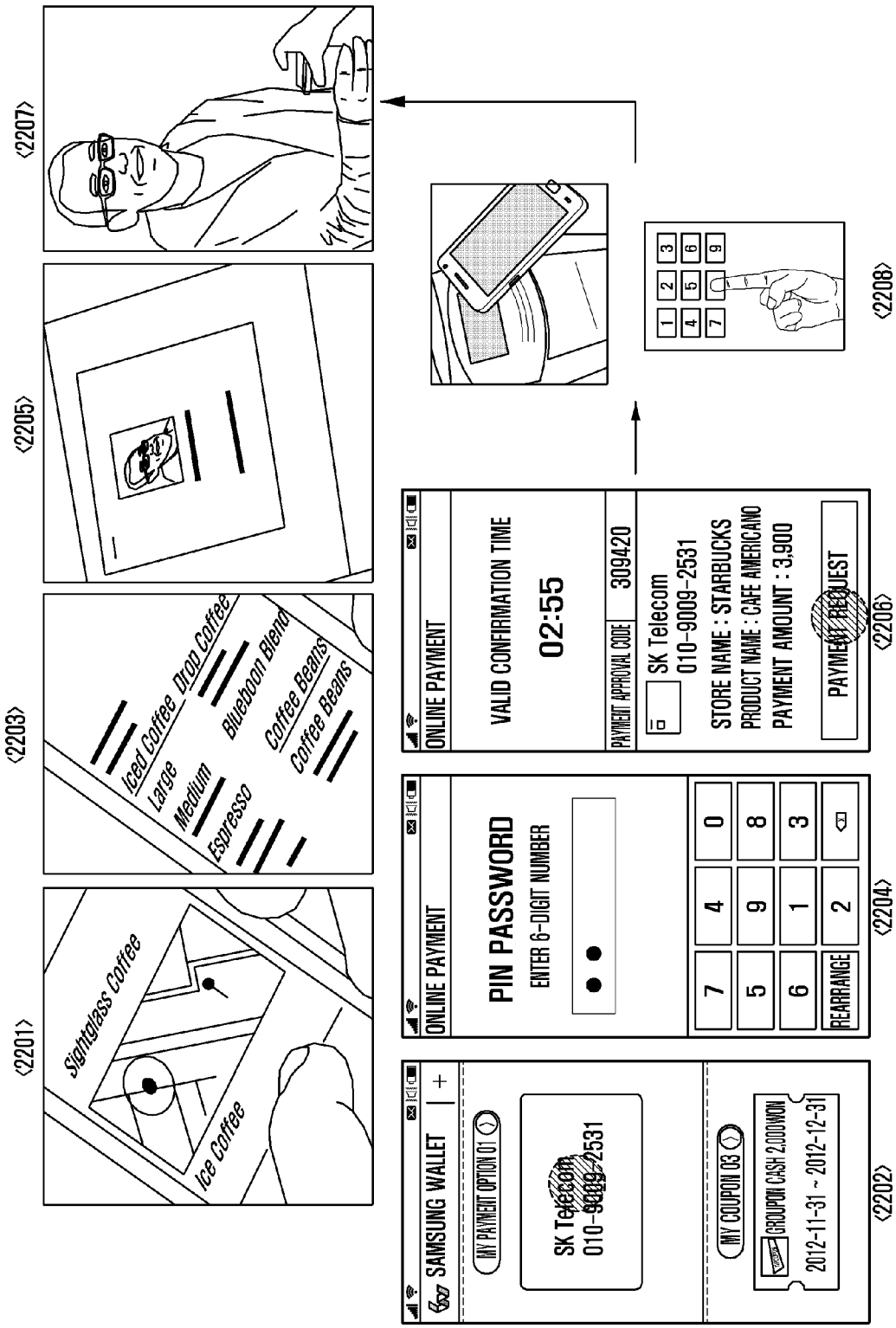
FIG. 22 depicts a payment making procedure based on identification card information input according to an embodiment of the present disclosure.

FIG. 22 depicts a payment making procedure based on identification card information according to an embodiment of the present disclosure.

Referring to FIG. 22, the user of the terminal device 100 may locate nearby coffee shops through an application as in a screen 2201. The terminal device 100 may output the menu of a selected coffee shop as in a screen 2203. To this end, the terminal device 100 may activate the communication unit 110, connect to a member store apparatus 400 operated by the selected coffee shop, and receive a server page containing the menu from the member store apparatus 400. The user selects an item from the screen 2201 and makes payment for the item.

More specifically, when the user selects a menu item, the terminal device 100 may automatically activate the wallet program. Upon login completion, the terminal device 100 may output a page for payment option selection received from the app server equipment 290 as in a screen 2202. When a payment option is selected, the terminal device 100 may output a screen for PIN input as in a screen 2204. Upon completion of PIN input, the terminal device 100 sends the PIN information via the app server equipment 290 to the financial support apparatus 500. When the PIN information is correct, the financial support apparatus 500 sends a confirmation page having a valid confirmation time to the terminal device 100. The terminal device 100 outputs the confirmation page and waits for user input for terminal verification within the valid confirmation time as in a screen 2206. Meanwhile, before or after PIN input (state indicated by the screen 2204), the terminal device 100 may set a time limit for the identification card. When the user sets a valid payment time for the identification card, the terminal device 100 may send information on the valid payment time to the financial support apparatus 500 or the wallet server apparatus 200. Upon reception of information on the valid payment time, the wallet server apparatus 200 or the like may determine validity of received identification card information by examining whether the identification card information is received within the valid payment time. The valid payment time may be output or not output by the terminal device 100.

The terminal device 100 may send identification card information (received from the input unit or pre-stored) to the member store apparatus 400 through short-range wireless communication as illustrated at 2208. The member store apparatus 400 may be equipped with a reader or may support short-range wireless communication.

When identification card information is obtained, the terminal device 100 may send the same to the wallet server apparatus 200. The app server equipment 290 may determine validity of the identification card information by comparing the identification card information received from the terminal device 100 with the identification card information received from the terminal verification server 280. When the identification card information received from the terminal device 100 is valid, the app server equipment 290 sends corresponding payment information to the financial support apparatus 500. The financial support apparatus 500 performs payment approval and sends a payment approval completion message to the member store apparatus 400, which may output the payment approval completion message as in a screen 2205. The member store apparatus 400 may output user information such as a photograph for user identification. Optionally, the user may register a headshot together with the terminal device 100 in the app server equipment 290 or the financial support apparatus 500 that is additionally displayed in the screen 2205. The user is delivered his coffee as illustrated at 2207.

As described hereinabove, the payment support method of the present disclosure enables registration of hardware information of a terminal device 100 such as a serial number, MAC address, memory ID in conjunction with registration of payment information to thereby enhance security of payment operation. In particular, the app server equipment 290 of the wallet server apparatus 200 may store hardware information of the terminal device 100 and payment related information in an interrelated manner, providing a more stable security function.

Meanwhile, the terminal device 100 may further include various components according to design. For example, when the terminal device 100 is a communication terminal, the terminal device 100 may further include a local area communication module for local area communication, a data communication interface based on wired and wireless communication, an Internet communication module for Internet access and communication, and a digital broadcast reception module for receiving and playing digital broadcasts. Although possible variations according to the trend of digital convergence are too numerous to enumerate, it should be apparent to those skilled in the art that the terminal device 100 may further include a unit comparable to the above-described units, and one unit of the terminal device 100 may be removed or replaced with another unit.

The terminal device 100 of the present disclosure may be any information and communication appliance or multimedia appliance, such as a mobile communication terminal based on communication protocols supporting various communication systems, a Portable Multimedia Player (PMP), a digital broadcast receiver, a Personal Digital Assistant (PDA), a music player like an MP3 player, a portable game console, a smartphone, a laptop computer, or a handheld computer.

Various aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include Read-Only Memory (ROM), Random-Access Memory (RAM), CD-ROMs, magnetic tapes, floppy disks, and optical data storage devices. The non-transitory computer readable recording medium can also be distributed over network coupled computer systems so that the computer readable code is stored and executed in a distributed fashion. Also, functional programs, code, and code segments for accomplishing the present disclosure can be easily construed by programmers skilled in the art to which the present disclosure pertains.

At this point it should be noted that various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include Read-Only Memory (ROM), Random-Access Memory (RAM), CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for supporting a payment service in a wallet server apparatus, the method comprising:
  receiving, by a transceiver of the wallet server apparatus, account information and hardware information of a terminal device from the terminal device;
  generating, by at least one processor of the wallet server apparatus, personal identification information based on the received account information and the received hardware information of the terminal device;
  storing, by at least one memory of the wallet server apparatus, the personal identification information;
  receiving, by the transceiver of the wallet server apparatus, a payment request for a product purchase from the terminal device;
  receiving, by the transceiver of the wallet server apparatus, the personal identification information including the hardware information of the terminal device from the terminal device;
  performing, by the at least one processor of the wallet server apparatus, terminal verification based on the received personal identification information including the hardware information of the terminal device;
  sending, upon completion of the terminal verification, by the wallet server apparatus, the payment request for the product purchase to a financial support apparatus; and
  receiving, by the transceiver of the wallet server apparatus, a result of payment approval,
  wherein the hardware information is unique information for identifying the terminal device and associated with an electronic component embedded in the terminal device,
  wherein the hardware information comprises at least one of a serial number of the terminal device, media access control (MAC) information of the terminal device, or memory ID of the terminal device.

2. The method of claim 1, wherein the hardware information is automatically extracted from hardware configuration information on electronic components embedded in the terminal device.

3. The method of claim 1, further comprising sending, after the terminal verification, by the transceiver of the wallet server apparatus, payment option information preregistered by the terminal device to the terminal device.

4. The method of claim 1, further comprising one of:
  generating, by the wallet server apparatus, identification card information related to the account, providing the identification card information to the terminal device, and storing, according to a request from the terminal device, the identification card information so that the identification card information is mapped with information on the terminal device; and
  registering identification card information provided by the terminal device in the account open for the terminal device, and storing the identification card information so that the identification card information is mapped with information on the terminal device.

5. The method of claim 4, further comprising:
  receiving a payment request for a product purchase, the personal identification information, and one of payment options preregistered in the terminal device from the terminal device;
  receiving the identification card information from a member store apparatus, and sending the identification card information and the payment request to a financial support apparatus; and
  receiving payment approval for the payment request from the financial support apparatus according to validity of the identification card information.

6. The method of claim 4, wherein the providing of the identification card information comprises one of:
  fabricating, by the wallet server apparatus, an identification card containing the identification card information and delivering the identification card to the terminal device; and
  generating, by the wallet server apparatus, the identification card information as disposable information and sending the disposable identification card information to the terminal device.

7. The method of claim 6, wherein the disposable identification card information is sent through at least one of key input, a barcode reader, or short-range wireless communication.

8. A system for supporting a payment service, the system comprising:
  a terminal device configured to:
    store a wallet program used for the payment service,
    transmit, when the subscription of the payment service is requested through the wallet program, account information and hardware information of the terminal device to a wallet server apparatus, and
    receive a registration result from the wallet server apparatus; and
  a wallet server apparatus configured to:
    receive the account information and the hardware information from the terminal device,
    generate personal identification information based on the received account information and the received hardware information,
    store the generated personal identification information,
    receive a payment request for a product purchase and the personal identification information from the terminal device,
    perform, by the wallet server apparatus, terminal verification based on the received personal identification information including the hardware information of the terminal device, send, upon completion of the terminal verification, the payment request for the product purchase to a financial support apparatus, and receive a result of payment approval, wherein the hardware information is unique information for identifying the terminal device and associated with an electronic component embedded in the terminal device, and wherein the hardware information comprises at least one of a serial number of the terminal device, media access control (MAC) information of the terminal device, or memory ID of the terminal device.

9. A wallet server apparatus for supporting a payment service comprising:

a transceiver;

at least one processor; and at least one memory, wherein the at least one processor is configured to:

control the transceiver to receive account information and hardware information of a terminal device from the terminal device, generate personal identification information based on the account information and the hardware information of the terminal device, store the generated personal identification information, receive a payment request for a product purchase and the personal identification information from the terminal device, perform terminal verification based on the received personal identification information including the hardware information of the terminal device, send, upon completion of the terminal verification, the payment request for the product purchase to a financial support apparatus, and receive a result of payment approval, and wherein the hardware information is unique information for identifying the terminal device and associated with an electronic component embedded in the terminal device, and wherein the hardware information comprises at least one of a serial number of the terminal device, media access control (MAC) information of the terminal device, or memory ID of the terminal device.

10. The apparatus of claim 9, wherein the hardware information is automatically extracted from hardware configuration information on electronic components embedded in the terminal device.

11. The apparatus of claim 9, wherein the at least one processor sends, after the terminal verification, payment option information preregistered by the terminal device to the terminal device.

12. The apparatus of claim 9, wherein the at least one processor is further configured to:

generate identification card information related to the account, provide the identification card information to the terminal device, and store according to a request from the terminal device, the identification card information so that the identification card information is mapped with information on the terminal device, or register identification card information provided by the terminal device in the account open for the terminal device, and store the identification card information so that the identification card information is mapped with information on the terminal device.

13. The apparatus of claim 12, wherein the at least one processor is further configured to:

receive a payment request for a product purchase, the personal identification information, and one of payment options preregistered in the terminal device from the terminal device;

receive the identification card information from a member store apparatus, and send the identification card information and the payment request to a financial support apparatus; and receive payment approval for the payment request from the financial support apparatus according to validity of the identification card information.

14. The apparatus of claim 12, wherein the identification card information is fabricated as an identification card containing the identification card information, or is generated as disposable information and the at least one processor sends the disposable identification card information to the terminal device.

15. A terminal device for supporting a payment service comprising:

at least one memory configured to store a wallet program used for the payment service;

at least one processor configured to control a subscription of the payment service through the wallet program; and a transceiver configured to:

transmit, when the subscription of the payment service is requested, account information and hardware information of the terminal device to a wallet server apparatus, and receive a registration result from the wallet server apparatus, the registration result based on personal identification information generated by at least one processor of the wallet server apparatus based on the transmitted account information and the transmitted hardware information, wherein the hardware information is unique information for identifying the terminal device and associated with an electronic component embedded in the terminal device, and wherein the hardware information comprises at least one of a serial number of the terminal device, media access control (MAC) information of the terminal device, or memory ID of the terminal device.

16. The terminal device of claim 15, wherein the hardware information is automatically extracted from hardware configuration information on electronic components embedded in the terminal device.

17. The terminal device of claim 15, wherein the at least one processor connects to the wallet server apparatus using the wallet program installed to access the wallet server apparatus when the wallet program is selected for activation or by automatically activating the wallet program according to a request from the wallet server apparatus.

18. A method for supporting a payment service in a terminal device comprising:

detecting, by at least one processor of the terminal device, a request of a subscription of the payment service through a wallet program;

transmitting, by a transceiver of the terminal device, account information and hardware information of the terminal device to a wallet server apparatus; and receiving, by the transceiver of the terminal device, a registration result from the wallet server apparatus, the registration result based on personal identification information generated by at least one processor of the wallet server apparatus based on the transmitted account information and the transmitted hardware information, wherein the hardware information is unique information for identifying the terminal device and associated with an electronic component embedded in the terminal device, and wherein the hardware information comprises at least one of a serial number of the terminal device, media access control (MAC) information of the terminal device, or memory ID of the terminal device.

19. The method of claim 18, wherein the hardware information is automatically extracted from hardware configuration information on electronic components embedded in the terminal device.

20. The method of claim 18, further comprising accessing, by the terminal device, a communication network to connect to the wallet server apparatus and send personal information to the wallet server apparatus.

* * * * *